United States Patent
Turner

(10) Patent No.: US 6,255,017 B1
(45) Date of Patent: Jul. 3, 2001

(54) ELECTRODE MATERIAL AND COMPOSITIONS INCLUDING SAME

(75) Inventor: Robert L. Turner, Woodbury, MN (US)

(73) Assignee: 3M Innovative Properties Co., St. Paul, MN (US)

( * ) Notice: Subject to any disclaimer, the term of this patent is extended or adjusted under 35 U.S.C. 154(b) by 0 days.

(21) Appl. No.: 09/113,385

(22) Filed: Jul. 10, 1998

(51) Int. Cl.$^7$ ..................................................... H01M 4/58

(52) U.S. Cl. .................................. 429/218.1; 429/231.9; 429/231.6; 429/231.5; 429/209

(58) Field of Search ........................... 429/218.1, 231.95, 429/232, 229, 231.6, 231.9, 222, 225, 231.5

(56) References Cited

U.S. PATENT DOCUMENTS

| | | | |
|---|---|---|---|
| 4,011,372 | 3/1977 | Tomczuk et al. | 429/218 |
| 4,048,395 | 9/1977 | Lai | 429/112 |
| 4,076,905 | 2/1978 | Sammells | 429/112 |

(List continued on next page.)

FOREIGN PATENT DOCUMENTS

| | | |
|---|---|---|
| 2134052 | 4/1995 | (CA) . |
| 2134053 | 4/1995 | (CA) . |
| 2143388 | 8/1995 | (CA) . |
| 0 690 517 | 1/1996 | (EP) ................................ H01M/4/40 |
| 0 855 752 | 7/1998 | (EP) ................................ H01M/4/02 |
| 61-66369 | 4/1986 | (JP) . |
| 63-13264 | 1/1988 | (JP) . |
| 63-141259 | 6/1988 | (JP) . |
| 4-206264 | 7/1992 | (JP) ................................ H01M/4/02 |
| 6-325764 | 11/1994 | (JP) . |
| 7-288127 | 10/1995 | (JP) . |
| 7-296812 | 11/1995 | (JP) . |
| 7-312219 | 11/1995 | (JP) . |
| 10-3920 | 1/1998 | (JP) . |
| WO 91/00624 | 1/1991 | (WO) . |
| WO96/3351 | 10/1996 | (WO) . |

OTHER PUBLICATIONS

Courtney et al., "Electrochemical and In Situ X–Ray Diffraction Studies of the Reaction of Lithium with Tin Oxide Composites", *J. Electrochem. Soc.*, 144(6):2045–2052 (Jun. 1997).

Anani et al., "Investigation of a Ternary Lithium Alloy Mixed–Conducting Matrix Electrode at Ambient Temperature", *J. Electrochem. Soc.: Solid–State Science and Technology*, pp. 2103–2105 (Aug. 1988).

Besenhard et al., "Binary and Ternary Li–Alloys as Anode Materials In Rechargeable Organic Electrolyte Li–Batteries", *Solid State Ionics*, vols. 18 & 19, pp. 823–827 (1986).

Besenhard et al., "Will advanced lithium–alloy anodes have a chance in lithium–ion batteries?", *J. of Power Sources*, 68:87–90 (1997).

Besenhard et al., "Dimensionally Stable Li–Alloy Electrodes For Secondary Batteries", *Solid State Ionics*, 40/41:525–529 (1990).

Besenhard et al., "Will Advanced Li–Alloy Anodes Have A Chance In Lithium–Ion Batteries?", Paper Presented @ the 8th International Meeting on Lithium Batteries, Nagoya Japan, Jun. 1996, Extended Abstracts p. 69.

Dahn et al., "Mechanisms for Lithium Insertion in Carbonaceous Materials", *Science*, 270:590–593 (Oct. 27, 1995).

(List continued on next page.)

*Primary Examiner*—Carol Chaney
*Assistant Examiner*—R. Alejandro
(74) *Attorney, Agent, or Firm*—Lucy C. Weiss; Dorothy A. Whelan

(57) ABSTRACT

An electrode composition that includes an electrode material consisting essentially of a plurality of electrochemically active metal elements in which the electrode material has a microstructure comprising these elements in the form of a mixture that is essentially free of domains measuring greater than about 1000 angstroms.

40 Claims, 18 Drawing Sheets

U.S. PATENT DOCUMENTS

| | | | |
|---|---|---|---|
| 4,318,969 | 3/1982 | Peled et al. | 429/105 |
| 4,434,213 | 2/1984 | Niles et al. | 429/3 |
| 4,436,796 | 3/1984 | Huggins et al. | 429/112 |
| 4,489,143 | 12/1984 | Gilbert et al. | 429/103 |
| 4,547,442 | 10/1985 | Besenhard et al. | 429/209 |
| 4,626,335 | 12/1986 | Cupp et al. | 204/293 |
| 4,632,889 | 12/1986 | McManis et al. | 429/218 |
| 4,652,506 | 3/1987 | Belanger et al. | 429/192 |
| 4,758,484 | 7/1988 | Furukawa et al. | 429/194 |
| 4,820,599 | 4/1989 | Furukawa et al. | 429/194 |
| 4,851,309 | 7/1989 | Toyoguchi et al. | 429/194 |
| 4,888,258 | 12/1989 | Desjardins et al. | 429/194 |
| 4,915,985 | 4/1990 | Maxfield et al. | 427/126.6 |
| 4,996,129 | 2/1991 | Tuck | 429/194 |
| 5,278,005 | 1/1994 | Yamauchi et al. | 429/194 |
| 5,283,136 | 2/1994 | Peled et al. | 429/192 |
| 5,294,503 | 3/1994 | Huang et al. | 429/194 |
| 5,350,647 | 9/1994 | Hope et al. | 429/218 |
| 5,395,711 | 3/1995 | Tahara et al. | 429/197 |
| 5,437,940 | 8/1995 | Hilston et al. | 429/103 |
| 5,494,762 | 2/1996 | Isoyama et al. | 429/194 |
| 5,536,600 | 7/1996 | Kaun | 429/223 |
| 5,569,561 | 10/1996 | Exnar et al. | 429/218 |
| 5,618,640 | 4/1997 | Idota et al. | 429/194 |
| 5,656,394 | 8/1997 | Koksbang et al. | 429/218 |
| 5,952,040 * | 9/1999 | Yadav et al. | 427/126.3 |
| 5,965,297 * | 11/2000 | Fauteux et al. | 429/231.8 |
| 6,143,448 * | 11/2000 | Fauteux et al. | 429/231.8 |

OTHER PUBLICATIONS

Yang et al., "Small particle size multiphase Li–alloy anodes for lithium–ion–batteries", *Solid State Ionics*, 90:281–287 (1996).

Courtney et al., "Key Factors Controlling the Reversibility of the Reaction of Lithium with $SnO_2$ and $SN_2BPO_6$ Glass", *J. Electrochem. Soc.*, 144(9):2943–2948 (Sep. 1997).

Wang, et al., "Behavior of Some Binary Lithium Alloys as Negative Electrodes in Organic Solvent–Based Electrolytes", *J. Electrochem. Soc.*, 133(3):457–460 (Mar. 1986).

Richard et al., "A Cell for In Situ X–Ray Dittraction Based on Coin Cell Hardware and Bellcore Plastic Electrode Technology", *J. Electrochem. Soc.*, 144(2):554–557 (Feb. 1997).

Idota et al., "Tin–Based Amorphous Oxide: A High–Capacity Lithium–Ion–Storage Material", *Science*, 276:1395–1397 (May 1997).

Fauteux et al., "Rechargeable lithium battery anodes: alternatives to metallic lithium", *J. Applied Electrochemistry*, 23:1–10 (1993).

Dey, "Electrochemical Alloying of Lithium in Organic Electrolytes", *J. Electrochem. Soc.*, 118(10):1547–1549 (1971).

Boukamp et al., "All–Solid Lithium Electrodes with Mixed–Conductor Matrix", *J. Electrochem. Soc.*, 128(4):725–728 (1981).

* cited by examiner

ELECTRODE MATERIAL AND COMPOSITIONS INCLUDING SAME

BACKGROUND OF THE INVENTION

This invention relates to electrode materials useful in secondary lithium batteries.

Two classes of materials have been proposed as anodes for secondary lithium batteries. One class includes materials such as graphite and carbon which are capable of intercalating lithium. While the intercalation anodes generally exhibit good cycle life and coulombic efficiency, their capacity is relatively low. A second class includes metals that alloy with lithium metal. Although these alloy-type anodes generally exhibit higher capacities relative to intercalation-type anodes, they suffer from relatively poor cycle life and coulombic efficiency.

SUMMARY OF THE INVENTION

The invention provides electrode materials, and electrode compositions based on these materials, that are suitable for use in secondary lithium batteries. The electrode materials exhibit high initial specific and volumetric capacities that are retained even after repeated cycling, as well as high coulombic efficiencies. The electrode materials, and batteries incorporating these materials, are also readily manufactured.

To achieve these objectives, the invention features, in a first aspect, an electrode composition that includes an electrode material consisting essentially of a plurality of electrochemically active metal elements. The composition may further include additional materials such as carbon, graphite, and combinations thereof. The electrode material has a microstructure that includes the electrochemically active metal elements in the form of a mixture that is essentially free of domains measuring greater than about 1000 angstroms (preferably no greater than about 500 angstroms, more preferably no greater than about 100 angstroms, and even more preferably no greater than about 20 angstroms). Preferably, at least 50% (more preferably at least 80%) by volume of the electrode material is in the form of this mixture. The mixture does not exhibit a discernible electron diffraction or x-ray diffraction pattern characteristic of a crystalline material.

An "electrochemically active metal element" is an element that reacts with lithium under conditions typically encountered during charging and discharging in a lithium battery. The metal element is preferably in the form of an elemental metal.

"Metal element" is used throughout this application to refer to both metals and to metalloids such as silicon and germanium.

A "domain" is a region that consists essentially of a single electrochemically active metal element. The domain may be crystalline (i.e., it gives rise to a discernible electron or x-ray diffraction pattern characteristic of a crystalline material) or non-crystalline. The size of the domain refers to the longest dimension of the domain.

When incorporated in a lithium battery, the electrode composition preferably exhibits (i) a specific capacity of at least about 100 mAh/g for 30 full charge-discharge cycles and (ii) a coulombic efficiency of at least 99% (preferably at least 99.5%, more preferably at least 99.9%) for 30 full charge-discharge cycles when cycled to realize about 100 mAh/g of the composition. Preferably, this level of performance is realized for 500 cycles, more preferably for 1000 cycles.

In another preferred embodiment, the electrode composition, when incorporated in a lithium battery, exhibits (i) a specific capacity of at least about 500 mAh/g for 30 full charge-discharge cycles and (ii) a coulombic efficiency of at least 99% (preferably at least 99.5%, more preferably at least 99.9%) for 30 full charge-discharge cycles when cycled to realize about 500 mAh/g of the composition. Preferably, this level of performance is realized for 200 cycles, more preferably for 500 cycles.

In yet another preferred embodiment, the electrode composition, when incorporated in a lithium battery, exhibits (i) a specific capacity of at least about 1000 mAh/g for 30 full charge-discharge cycles and (ii) a coulombic efficiency of at least 99% (preferably at least 99/5%, more preferably at least 99/9%) for 30 full charge-discharge cycles when cycled to realize about 1000 mAh/g of the composition. Preferably, this level of performance is realized for 100 cycles, more preferably for 300 cycles.

The electrode composition may be in the form of a powder or a thin film. Examples of preferred electrochemically active metal elements include aluminum, silicon, tin, antimony, lead, germanium, magnesium, zinc, cadmium, bismuth, and indium. Particularly preferred electrode compositions feature a combination of (a) aluminum and silicon or (b) tin and silicon.

In a second aspect, the invention features a method of preparing the above-described electrode composition that includes sequentially sputter-depositing sources of electrochemically active metal elements to form the electrode composition in the form of a thin film.

Other features and advantages of the invention will be apparent from the following description of the preferred embodiments thereof, and from the claims.

DETAILED DESCRIPTION

Figure 1A:
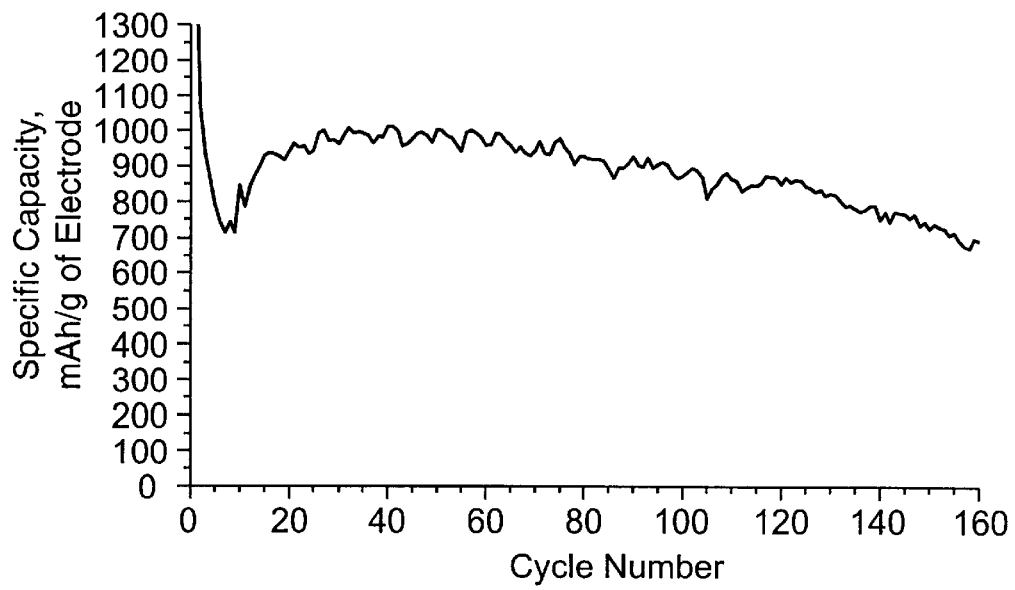
FIG. 1 illustrates the cycling performance, in terms of reversible specific capacity (top graph) and coulombic efficiency (bottom graph), of the sputter-deposited aluminum-silicon electrode described in Example 1.

The invention features electrode materials, and electrode compositions that include these materials, that are particularly useful as anodes for secondary lithium batteries. The electrode materials feature two or more electrochemically active metal elements, and are characterized by a microstructure in which these elements are in the form of a mixture. The mixture does not give rise to a discernible x-ray or electron diffraction pattern, and is essentially free of large domains (e.g., on the order of 1000 angstroms or greater). In general, the smaller the domain size, the better the electrochemical performance of the material.

Examples of suitable electrochemically active metal elements are described in the Summary of the Invention, above. Particularly preferred are combinations of (a) elemental aluminum and elemental silicon, and (b) elemental tin and elemental silicon.

The preferred process for preparing the electrode material is sputtering in which the electrochemically active metal elements are sequentially sputter-coated onto a substrate (e.g., a copper substrate) to form the electrode material in the form of a thin film. Preferably, the electrode includes a sputter-deposited prelayer of one of the elements and a sputter-deposited overlayer of one of the elements. In general, the substrates are placed near the edge of a nominally 25 inch diameter turntable which rotates continuously below two 6 inch diameter magnetron sputtering sources operated continuously. A layer of one material is deposited as the substrate passes under the first source, and a layer of the second material is deposited as the substrate passes under the second source.

The electrode materials are particularly useful as anodes for secondary lithium batteries. The electrode material may be used as is, or may be combined with additional material, e.g., carbon, graphite, polymer binder, low voltage oxides, nitrides, to form an electrode composition. To prepare a battery, the electrode material or composition is combined with an electrolyte and a cathode (the counterelectrode). The electrolyte may be a solid or liquid electrolyte. Examples of solid electrolytes include polymeric electrolytes such as polyethylene oxide, ethylene oxide-propylene oxide copolymers, fluorine-containing copolymers, and combinations thereof. Examples of liquid electrolytes include ethylene carbonate, diethylene carbonate, propylene carbonate, and combinations thereof. The electrolyte is provided with a lithium electrolyte salt. Examples of suitable salts include $LiPF_6$, $LiBF_4$, and $LiClO_4$.

Examples of suitable cathode compositions for liquid electrolyte-containing batteries include $LiCoO_2$, $LiCo_{0.2}Ni_{0.8}O_2$, and $Li_{1.07}Mn_{1.93}O_4$. Examples of suitable cathode compositions for solid electrolyte-containing batteries include $LiV_3O_8$, $LiV_2O_5$, $LiV_3O_{13}$, and $LiMnO_2$.

The invention will now be described further by way of the following examples.

EXAMPLES

Sputtering Procedure

Electrode materials in the form of thin films were prepared by sequential sputtering using a modified Perkin-Elmer Randex Model 2400-8SA Sputtering System. The original 8 inch diameter rf sputter sources were replaced with 6 inch diameter dc magnetron sputtering sources commercially available from Materials Science of San Diego Calif. The sputtering sources were powered using Advanced Energy Model MDX-10 dc sputtering power supplies operating in constant current mode. The turntable drive unit of the Randex System was replaced with a stepper motor to improve rotation speed range and control. The System was pumped with an untrapped oil diffusion pump backed by a conventional rotary vane pump.

Sputtering was performed at argon pressures in the range of 3–30 mTorr. The pressure was maintained by controlling the argon flow in combination with a venetian blind-style conductance limiter placed over the diffusion pump.

A copper foil (thickness=0.001 inch) was bonded to the water-cooled substrate turntable of the Randex System using double sided adhesive tape (3M Brand Y9415, commercially available from 3M Company of St. Paul, Minn.). The system was closed and pumped down, typically to base pressures below $1 \times 10^{-5}$ Torr (the base pressure prior to deposition is not critical). In some cases, the samples were etched prior to deposition using the "Sputter Etch" mode of the Randex System with 13.56 MHz power applied to the substrate turntable and an argon pressure of 8 mTorr in the sputtering chamber. This procedure caused the copper foil surface to be bombarded with moderate energy argon ions (100–150 eV) to further clean the copper and insure good adhesion of the sputtered film to the copper surface. A typical cleaning cycle was 150 W for 30 minutes, with the substrate table rotating during the cycle.

Following etching, the sputtering sources were started up using a mechanical shutter between the sources and the copper substrate. This removed contaminants from the source surface without depositing them on the substrate surface. Next, a "pre-layer" made of a single material of known identity was deposited onto the substrate. The purpose of the pre-layer was to insure good adhesion between the substrate and the sputter deposited film. Next, both sources were started up at pre-determined current levels and deposition initiated. After a suitable deposition time, one or both sources were turned off. A "post-layer" of a single material of known identity was then deposited, after which the system was vented and the sample removed.

Nine films (corresponding to Examples 1–9) were prepared following the above-described procedure. Sputtering conditions are summarized in Table I, below. In Table I, "current" refers to the current level, in amps, of the individual sputtering source. "Pressure" refers to the argon pressure, in mTorr, in the sputtering chamber. "Run time" refers to the amount of time required for deposition, exclusive of the pre- and post-layers.

slices were taken along the radial direction of the film) or the perpendicular direction of the film (i.e., slices were taken along the tangential direction of the film). The cut samples were then embedded in 3M Scotchcast™ Electrical Resin #5 (commercially available from 3M Company of St. Paul, Minn.) and ultramicrotomed to obtain slices thin enough for TEM examination. Slice thickness was nominally 24 nm.

The TEM instrumentation used to obtain microstructural data was a HITACHI H9000-NAR transmission electron microscope which operates at an accelerating voltage of 300 kV. It is capable of a point-to-point resolution of 1.75 angstroms and a microprobe resolution of 16 angstroms for x-ray microanalysis. The microanalysis instrumentation consisted of a NORAN VOYAGER III. Direct-to-digital

TABLE I

| Example | Materials | Currents A | Rot. RPM | Pressure mTorr | Run Time Min | Pre Layer | Time Min | Post Layer | Time Min | Etch Time |
|---|---|---|---|---|---|---|---|---|---|---|
| 1 | Al | 1.5 | 38 | 15 | 100 |    |     | Al | 1 | 30 |
|   | Si | 1.5 |    |    |     | Si | 2.5 |    |   |    |
| 2 | Al | 3   | 38 | 15 | 50  |    |     | Al | 0.5 | 30 |
|   | Si | 3   |    |    |     | Si | 1   |    |   |    |
| 3 | Al | 3   | 38 | 15 | 50  |    |     | Al | 0.5 | 30 |
|   | Si | 2.5 |    |    |     | Si | 1.5 |    |   |    |
| 4 | Al | 3   | 38 | 15 | 50  |    |     | Al | 0.5 | 30 |
|   | Si | 2.0 |    |    |     | Si | 2   |    |   |    |
| 5 | Al | 3   | 38 | 15 | 45  |    |     | Al | 0.5 | 30 |
|   | Si | 1.5 |    |    |     | Si | 2.5 |    |   |    |
| 6 | Sn | 0.2 | 38 | 15 | 80  |    |     | None |  | 30 |
|   | Si | 1   |    |    |     | Si | 5   |    |   |    |
| 7 | Sn | 0.4 | 38 | 15 | 60  |    |     | None |  | 30 |
|   | Si | 1   |    |    |     | Si | 5   |    |   |    |
| 8 | Sn | 0.55| 38 | 15 | 60  |    |     | None |  | 30 |
|   | Si | 1   |    |    |     | Si | 5   |    |   |    |
| 9 | Sn | 0.75| 38 | 15 | 45  |    |     | None |  | 30 |
|   | Si | 1   |    |    |     | Si | 5   |    |   |    |

The composition, microstructure, and cycling behavior of these films are described in further detail, below.

Chemical Composition

The chemical composition, in wt. % and vol. %, was determined using a series of calibration experiments in which a single source was operated at a fixed current for a fixed period of time. The thickness of the resulting sample was then determined using a profilometer. The vol. % of the sample was predicted based upon the calibration experiments assuming that the total thickness of any one material was linearly proportional to the deposition current and the deposition time. The wt. % values were calculated from the vol. % values using handbook values of material densities.

Transmission Electron Microscopy

Transmission electron microscopy ("TEM") was used to examine the microstructure of the sputtered electrode films before cycling. This technique produces images of the microstructure using spatial variations in transmitted intensity associated with spatial variations in the structure, chemistry, and/or thickness of the sample. Because the radiation used to form these images consists of high energy electrons of very short wavelength, it is possible to obtain information at the atomic scale under high resolution electron microscopy (HREM) imaging conditions. Moreover, the interaction of these electrons with the sample produces information about the crystal structure (electron diffraction) and local chemistry (x-ray microanalysis) that is complementary to the information contained in the image.

Prior to cycling, samples were prepared from sputtered films by cutting the film in either the radial direction (i.e., image acquisition and quantitative length measurements were performed by a GATAN slow-scan CCD (charged-couple device) camera. Z-contrast images were generated using a JEOL 2010-F field emission TEM/STEM having a resolution limit for both imaging and microanalysis of 1.4 angstroms.

Cycling Behavior

Electrodes were cut from the sputtered films with a die measuring either 7.1 mm (1225 coin cell) or 16 mm (2325 coin cell) in diameter. Two types of cells for testing were then prepared. In the first type (half cell), the sputtered film formed the cathode and a lithium foil (about 300 micrometers thick, available from Aldrich Chemical Co. of Milwaukee, Wis.) formed the anode of a 1225 coin cell. In the second type (a full cell), the sputtered film formed the anode and a $LiCoO_2$-containing composition formed the cathode of a 2325 coin cell. The $LiCoO_2$-containing composition was made by combining 83% wt. % $LiCoO_2$ (available from Nippon Chemical Cellseed under the designation "C-10"), 7 wt. % fluoropolymer binder (available from Elf Atochem under the designation "Kynar 461"), 7.5 wt. % KS-6 carbon (available from Timcal), and 2.5% Super P Carbon (available from MMM Carbon).

Both types of cells were made with a 50 micrometer thick polyethylene separator. The electrolyte in all cells was 1 molal $LiPF_6$ in a 1:1 v/v mixture of ethylene carbonate and diethyl carbonate. Spacers were used as current collectors and to fill void areas in the cells. Copper or stainless steel spacers were used in the half cells, while aluminum spacers were used in the full cells.

The electrochemical performance of the cells was measured using a MACCOR cycler. The cycling conditions were typically set for constant current charge and discharge at approximately a C/3 rate (0.5 mA/cm$^2$) with typical cutoff voltages of 5 mV and 1.4 V. Where the anode was a lithium foil, the coulombic efficiency was determined as the charge recovery or capacity of delithiation divided by the capacity of lithiation. Where the anode was the sputtered film, the coulombic efficiency was determined as the ratio of the discharge capacity to the charge capacity.

X-Ray Diffraction

Diffraction patterns were collected using a Siemens D5000 diffractometer and a Siemens Model Kristalloflex 805 D500 diffractometer, both equipped with a copper target x-ray tube and a diffracted beam monochromator. Approximately 2 cm$^2$ samples of the thin film were mounted on the sample holder. Data was collected between scattering angles of 10 degrees and 80 degrees.

All the sputter-deposited samples were on a copper substrate which gives rise to a series of identifiable diffraction peaks at particular scattering angles. Specifically, the copper substrate gives rise to peaks at scattering angles of 43.30 degrees, 50.43 degrees, and 74.13 degrees, corresponding to Cu(111), Cu(200), and Cu(220), respectively.

We now describe the preparation and characterization of specific sputtered electrode films.

Example 1

A film containing 64 wt. % aluminum and 36 wt. % silicon was prepared by sputter deposition under the conditions shown in Table I. The aluminum was sputter deposited at a rate of 320 angstroms/minute, while the silicon was sputter deposited at a rate of 210 angstroms/minute. The film contained 60 vol. % aluminum and 40 vol. % silicon, calculated based upon these sputter rates. The film thickness was 4.7 micrometers and the film density was approximately 2.5 g/cm$^3$. The film had a pre-layer of pure silicon measuring approximately 530 angstroms thick and a post-layer of pure aluminum measuring approximately 310 angstroms thick.

The x-ray diffraction pattern of the sputtered film prior to cycling is shown in FIG. 13(*a*). The pattern shows no signal for crystalline silicon and a broad signal for crystalline aluminum at 38.5 degrees. The average aluminum grain size is approximately 80 angstroms, calculated from the width of the peak at 38.5 degrees. There are no peaks corresponding to aluminum- and silicon-containing compounds.

TEM and electron diffraction analysis of the film prior to cycling revealed that the microstructure included 11.1% by volume of crystalline aluminum particles and 88.9% by volume of a mixture of aluminum and silicon atoms. The average size of the crystalline aluminum particles was 14.0 nm by 9.6 nm, with an average aspect ratio of 1.42. The crystalline aluminum particles were preferentially oriented normal to the plane of the film.

Electron diffraction patterns indicated the presence of a two phase microstructure. One phase consisted of crystalline aluminum, as evidenced by sharp spots in a ring pattern which index to aluminum spacings of 2.34, 2.02, 1.43, and 1.22 angstroms, which, in turn, correspond, respectively, to the (111), (200), (220), and (311) lattice spacings of the face center cubic crystal structure for aluminum. The second phase was a mixture of very small aluminum and silicon domains characterized by a broad diffuse ring pattern, suggesting the absence of ordered crystalline material. The domain size was no greater than 20 angstroms.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/cm$^2$. The initial discharge (lithiation) specific capacity was approximately 2100 mAh/g. For comparison purposes, the theoretical specific capacity of the cell, calculated based upon the wt. % of the film and the assumption that aluminum reacts with 1 Li/Al atom and silicon reacts with 4.4 Li/Si atom, is 2160 mAh/g.

Figure 1B:
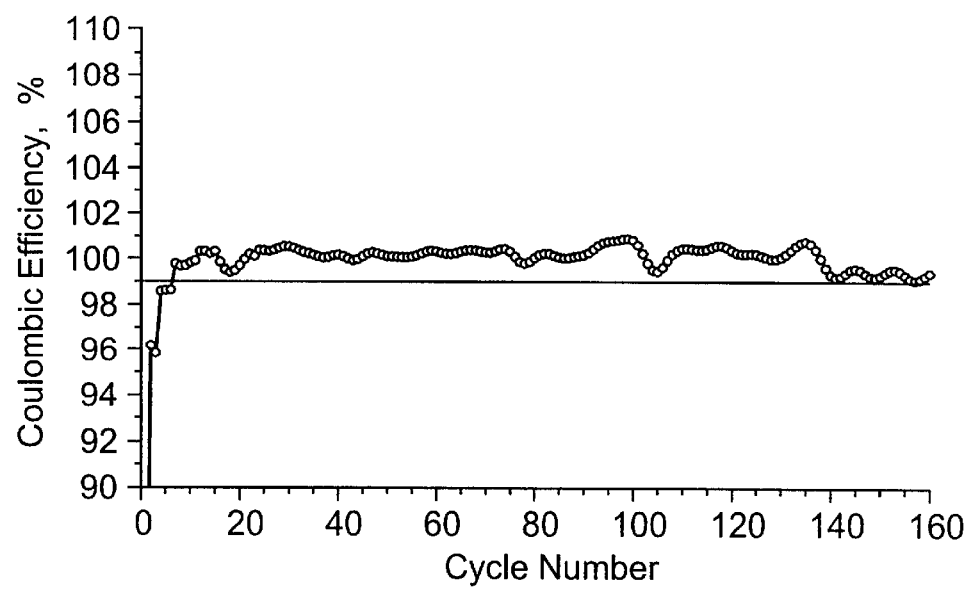

The cell was then placed under charge and discharge cycling conditions using a current of 0.5 mA/cm$^2$ and cutoff voltages of 5 mV and 0.9 V. The reversible specific capacity and coulombic efficiency of the cell are shown in FIG. 1. The results demonstrate that the electrode film will reversibly cycle at greater than 700 mAh/g for at least 150 cycles with a coulombic efficiency that is greater than 99.0%.

Figure 15A:
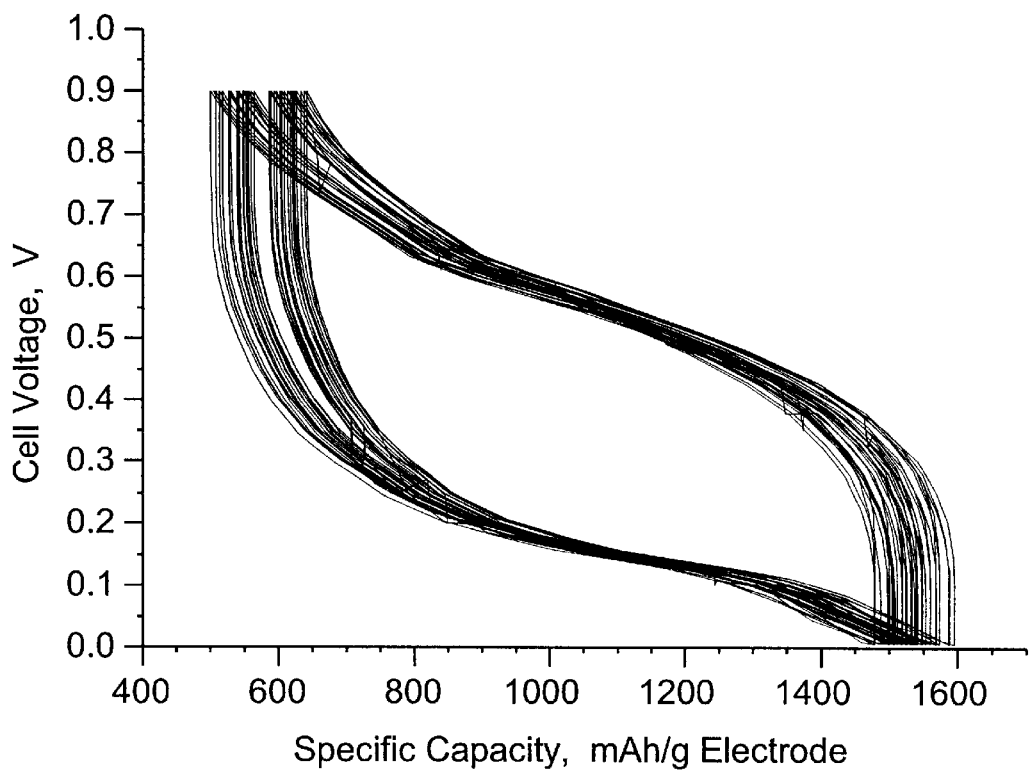
FIG. 15 is a charge/voltage curve and differential voltage curve for the sputter-deposited aluminum-silicon electrode described in Example 1.
Figure 15B:
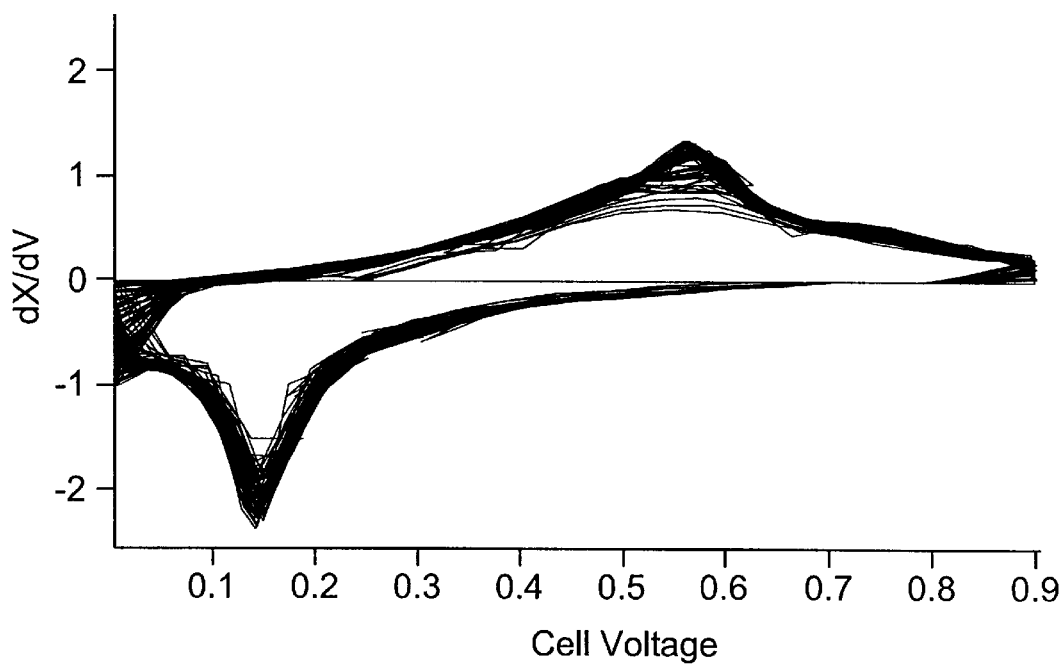

The charge/discharge voltage curve and the differential voltage curve from cycle 5 to cycle 75 are shown in FIG. 15. The data show that there are no significant changes in the electrochemical behavior during cycling, and that the capacity is realized over a broad voltage range.

Full cells were constructed as described above using a sputtered film as an anode and a LiCoO$_2$-containing composition as the cathode. The sputtered film was identical to the sputtered film described above except that sputtering was conducted for a total of 225 minutes to yield a 10.7 micrometer thick film. The mass balance of the full cell, calculated based upon the weight of the LiCoO$_2$ portion of the cathode and the weight of the sputtered film, was 7.18:1. The cell was then cycled with a constant charge and discharge current of 0.5 mA/cm$^2$ between 1.8 and 4.2 V.

Figure 2A:
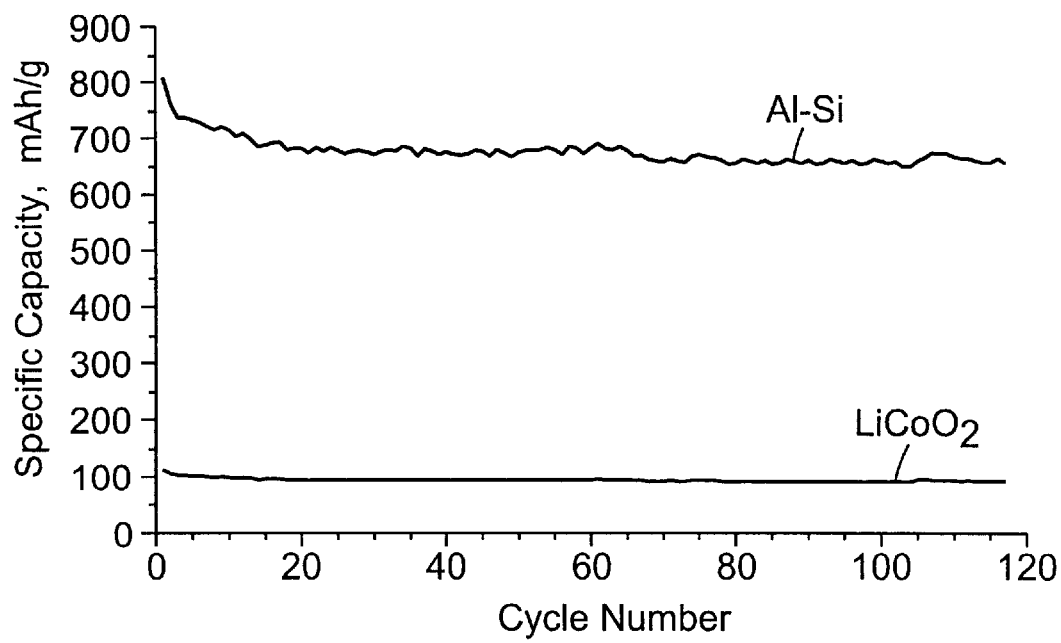
FIG. 2 illustrates the cycling performance, in terms of reversible specific capacity (top graph) and coulombic efficiency (bottom graph), of a full cell featuring the sputter-deposited aluminum-silicon electrode described in Example 1, and a $LiCoO_2$-containing cathode.
Figure 2B:
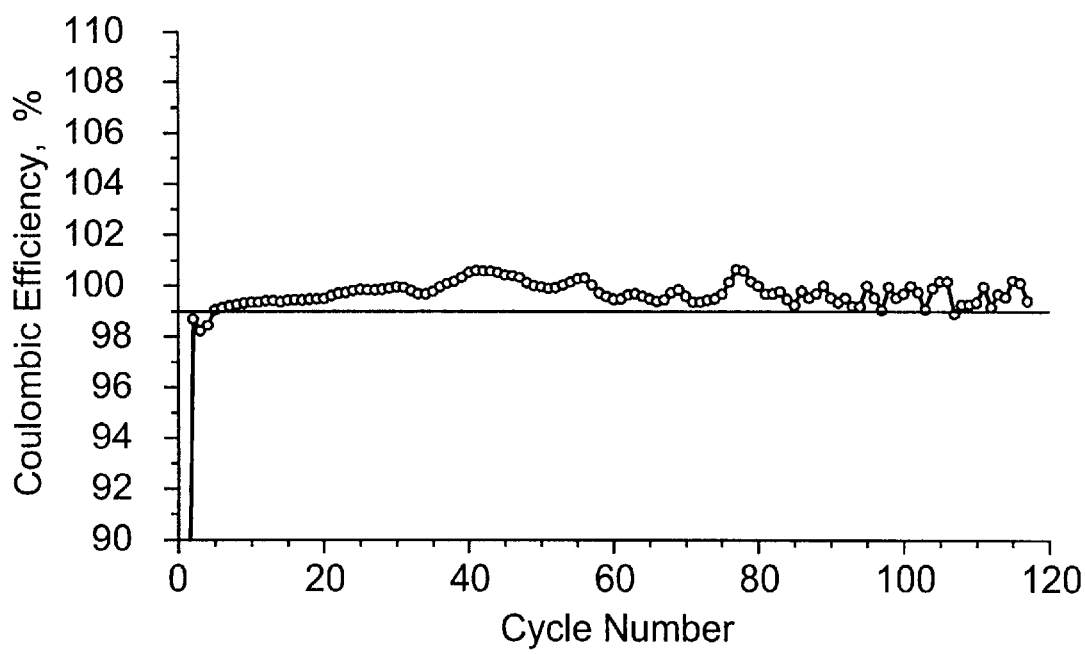

The specific capacity and coulombic efficiency of the cell is shown in FIG. 2. The first charge capacity was 148 mAh/g for LiCoO$_2$ and 1100 mAh/g for the aluminum-silicon material in the anode. The irreversible capacity in the first cycle was 24%. The specific capacity of the aluminum-silicon anode is similar to what was obtained in the coin cells described above using lithium foil as the anode. The specific capacity of the LiCoO$_2$ was maintained at 100 mAh/g, which is a reasonable capacity for this material.

The results demonstrate that the aluminum-silicon composition can be used in an electrochemical cell as an anode in combination with a cathode material (LiCoO$_2$) typically used in lithium-ion batteries. The coulombic efficiency of the cell remained about 99.0% for at least 120 cycles with very small capacity fade (about 0.1%/cycle).

Example 2

A film containing 64 wt. % aluminum and 36 wt. % silicon was prepared by sputter deposition under the conditions shown in Table I. The aluminum was sputter deposited at a rate of 640 angstroms/minute, while the silicon was sputter deposited at a rate of 420 angstroms/minute. The film contained 60 vol. % aluminum and 40 vol. % silicon, calculated based upon these sputter rates. The film thickness was 5.2 micrometers and the film density was approximately 2.6 g/cm$^3$. The film had a pre-layer of pure silicon measuring approximately 420 angstroms thick and a post-layer of pure aluminum measuring approximately 320 angstroms thick.

The x-ray diffraction pattern of the sputtered film prior to cycling is shown in FIG. 13(*b*). The pattern shows no signal for crystalline silicon and a broad signal for crystalline aluminum at 38.5 degrees. The average aluminum grain size is approximately 80 angstroms, calculated from the width of the peak at 38.5 degrees. There are no peaks corresponding to aluminum- and silicon-containing compounds. In addition, there were no significant differences between this pattern and the pattern obtained for the film described in Example 1.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/cm$^2$. The initial discharge (lithiation) specific capacity was approximately 2100 mAh/g. For comparison purposes, the theoretical specific capacity of the cell, calculated based upon the wt. % of the film and the assumption that aluminum reacts with 1 Li/Al atom and silicon reacts with 4.4 Li/Si atom, is 2160 mAh/g.

Figure 3A:
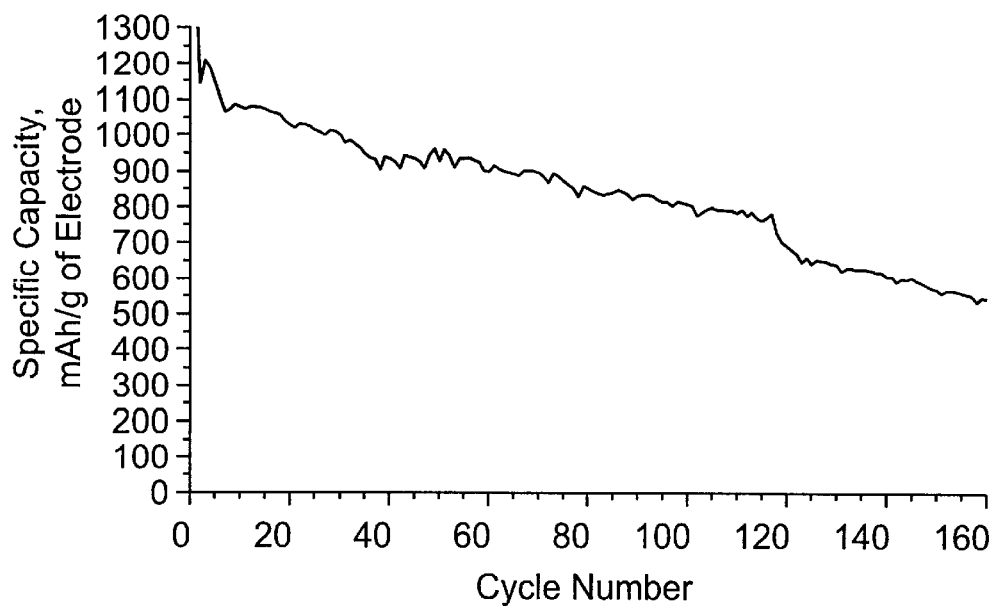
FIG. 3 illustrates the cycling performance, in terms of reversible specific capacity (top graph) and coulombic efficiency (bottom graph), of the sputter-deposited aluminum-silicon electrode described in Example 2.
Figure 3B:
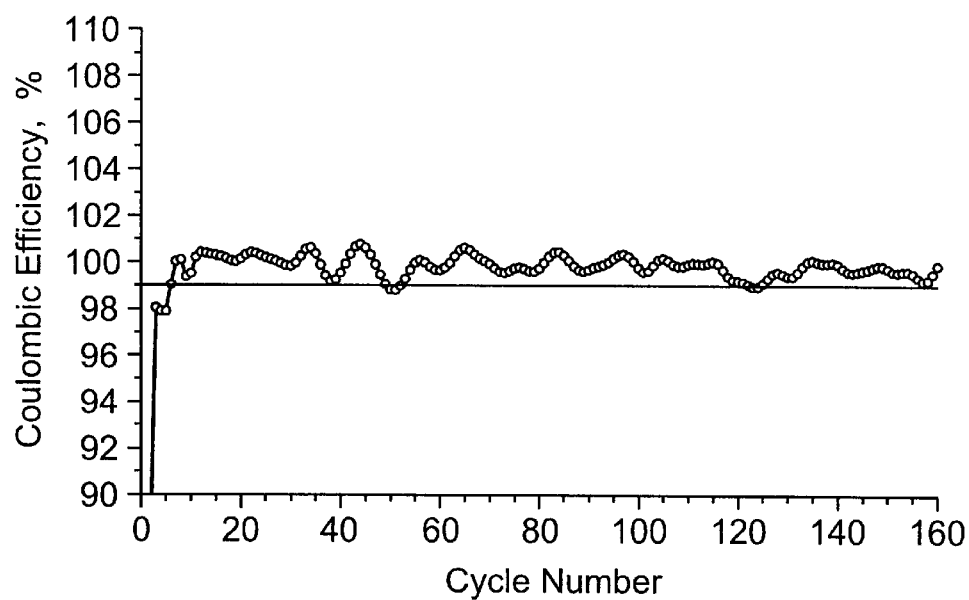

The cell was then placed under charge and discharge cycling conditions using a current of 0.5 mA/cm$^2$ and cutoff voltages of 5 mV and 1.0 V. The reversible specific capacity and coulombic efficiency of the cell are shown in FIG. 3.

Example 3

A film containing 68 wt. % aluminum and 32 wt. % silicon was prepared by sputter deposition under the conditions shown in Table I. The aluminum was sputter deposited at a rate of 640 angstroms/minute, while the silicon was sputter deposited at a rate of 350 angstroms/minute. The film contained 65 vol. % aluminum and 35 vol. % silicon, calculated based upon these sputter rates. The film thickness was 5.1 micrometers and the film density was approximately 2.6 g/cm$^3$. The film had a pre-layer of pure silicon measuring approximately 530 angstroms thick and a post-layer of pure aluminum measuring approximately 320 angstroms thick.

Figure 13A:
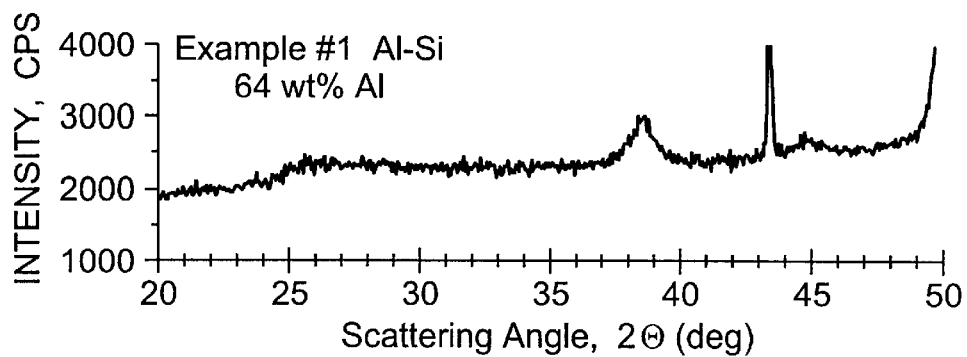
FIGS. 13(a), 13(b), 13(c), 13(d), and 13(e) are x-ray diffraction profiles for the aluminum-silicon films described in Examples 1–5, respectively, obtained prior to cycling.
Figure 13B:
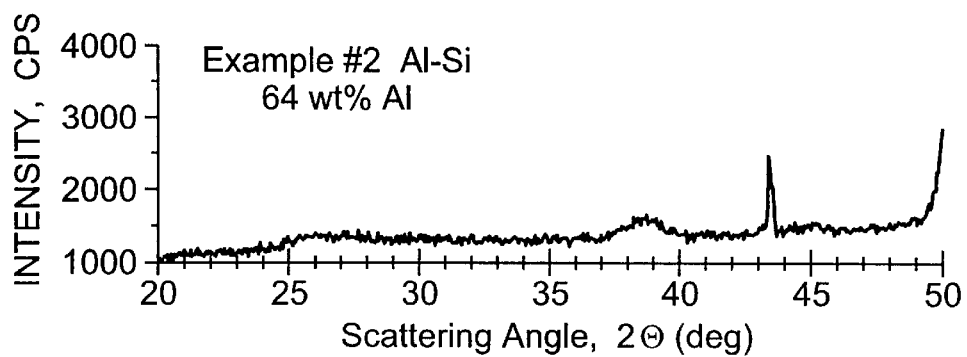
Figure 13C:
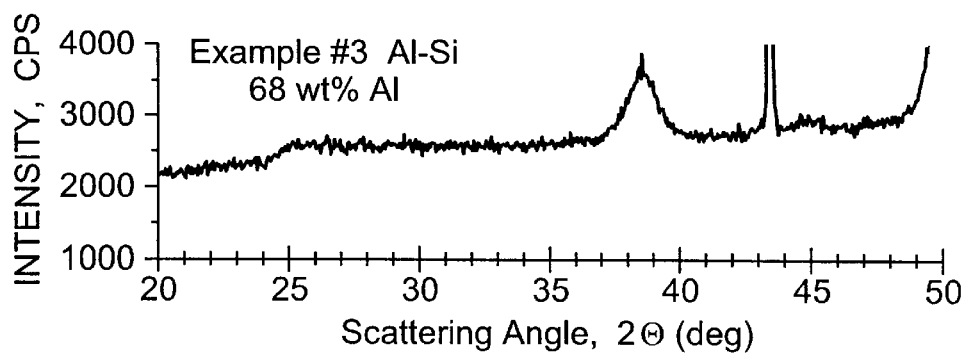

The x-ray diffraction pattern of the sputtered film prior to cycling is shown in FIG. 13(c). The pattern shows no signal for crystalline silicon and a broad signal for crystalline aluminum at 38.5 degrees. The average aluminum grain size is approximately 80 angstroms, calculated from the width of the peak at 38.5 degrees. There are no peaks corresponding to aluminum- and silicon-containing compounds.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/cm$^2$. The initial discharge (lithiation) specific capacity was approximately 2100 mAh/g. For comparison purposes, the theoretical specific capacity of the cell, calculated based upon the wt. % of the film and the assumption that aluminum reacts with 1 Li/Al atom and silicon reacts with 4.4 Li/Si atom, is 2030 mAh/g.

Figure 4A:
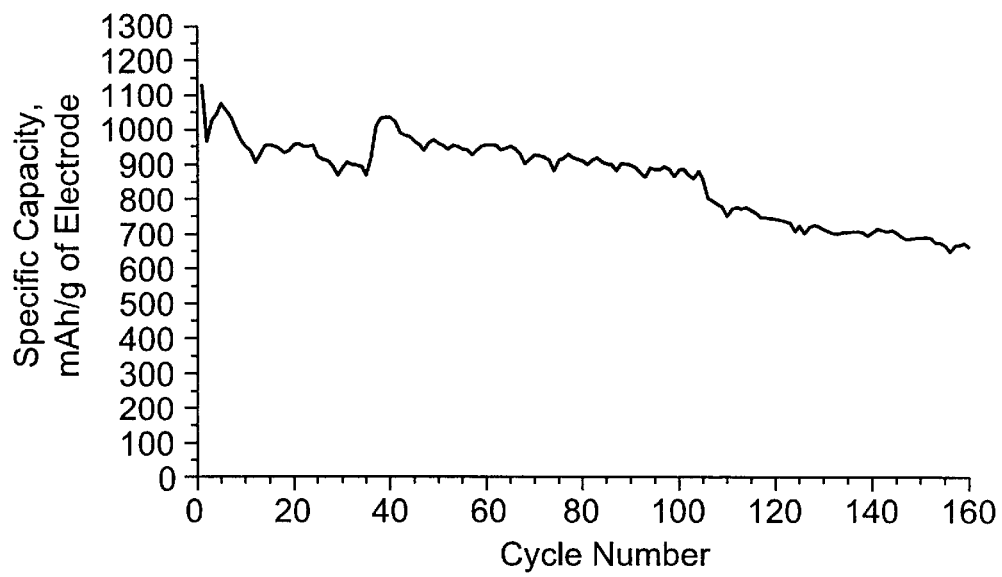
FIG. 4 illustrates the cycling performance, in terms of reversible specific capacity (top graph) and coulombic efficiency (bottom graph), of the sputter-deposited aluminum-silicon electrode described in Example 3.
Figure 4B:
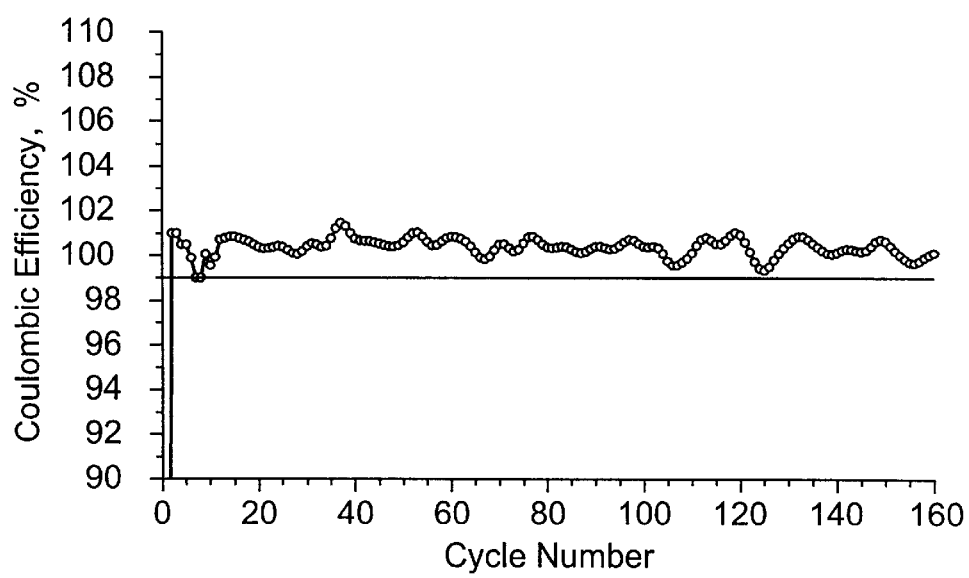

The cell was then placed under charge and discharge cycling conditions using a current of 0.5 mA/cm$^2$ and cutoff voltages of 5 mV and 1.0 V. The reversible specific capacity and coulombic efficiency of the cell are shown in FIG. 4. The results are similar to the results achieved in the case of the film described in Example 1.

Full cells were constructed as described above using a sputtered film as an anode and a LiCoO$_2$-containing composition as the cathode. The sputtered film was identical to the sputtered film described above except that sputtering was conducted for a total of 90 minutes to yield a 9.6 micrometer thick film. The mass balance of the full cell, calculated based upon the weight of the LiCoO$_2$ portion of the cathode and the weight of the sputtered film, was 7.1:1. The cell was then cycled with a constant charge and discharge current of 0.5 mA/cm$^2$ between 1.8 and 4.2 V.

Figure 5A:
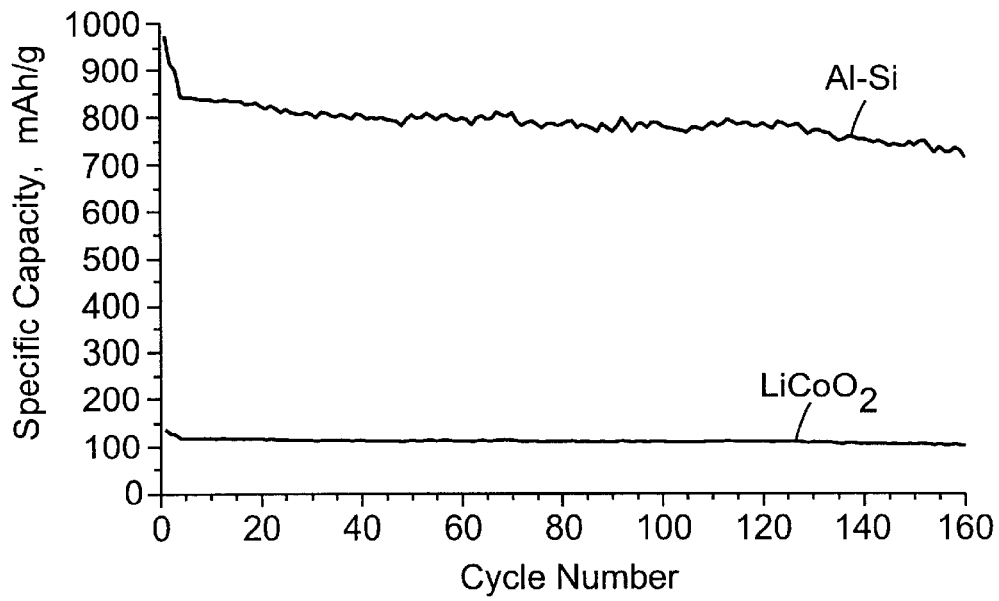
FIG. 5 illustrates the cycling performance, in terms of reversible specific capacity (top graph) and coulombic efficiency (bottom graph), of a full cell featuring the sputter-deposited aluminum-silicon electrode described in Example 3, and a $LiCoO_2$-containing cathode.
Figure 5B:
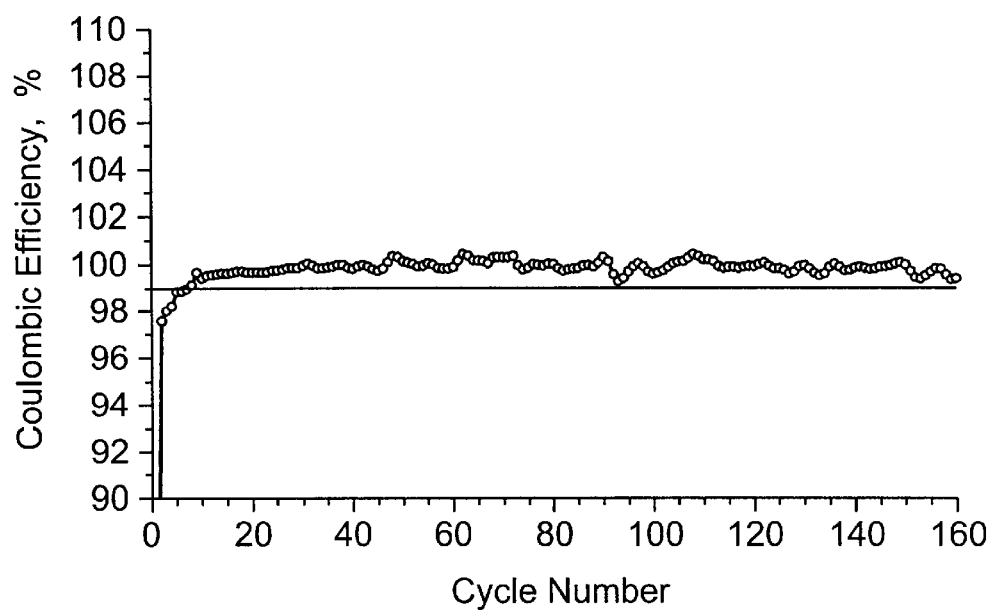

The specific capacity and coulombic efficiency of the cell is shown in FIG. 5. The first charge capacity was 160 mAh/g for LiCoO$_2$ and 1200 mAh/g for the aluminum-silicon material in the anode. The irreversible capacity in the first cycle was 20%. The specific capacity of the aluminum-silicon anode is similar to what was obtained in the coin cells described above using lithium foil as the anode. The specific capacity of the LiCoO$_2$ was maintained at approximately 110 mAh/g, which is a reasonable capacity for this material.

The results demonstrate that the aluminum-silicon composition can be used in an electrochemical cell as an anode in combination with a cathode material (LiCoO$_2$) typically used in lithium-ion batteries. The coulombic efficiency of the cell remained about 99.0% for at least 100 cycles with very small capacity fade (about 0.1%/cycle).

Example 4

A film containing 73 wt. % aluminum and 27 wt. % silicon was prepared by sputter deposition under the conditions shown in Table I. The aluminum was sputter deposited at a rate of 640 angstroms/minute, while the silicon was sputter deposited at a rate of 280 angstroms/minute. The film contained 70 vol. % aluminum and 30 vol. % silicon, calculated based upon these sputter rates. The film thickness was 4.7 micrometers and the film density was approximately 2.6 g/cm$^3$. The film had a pre-layer of pure silicon measuring approximately 560 angstroms thick and a post-layer of pure aluminum measuring approximately 320 angstroms thick.

Figure 13D:
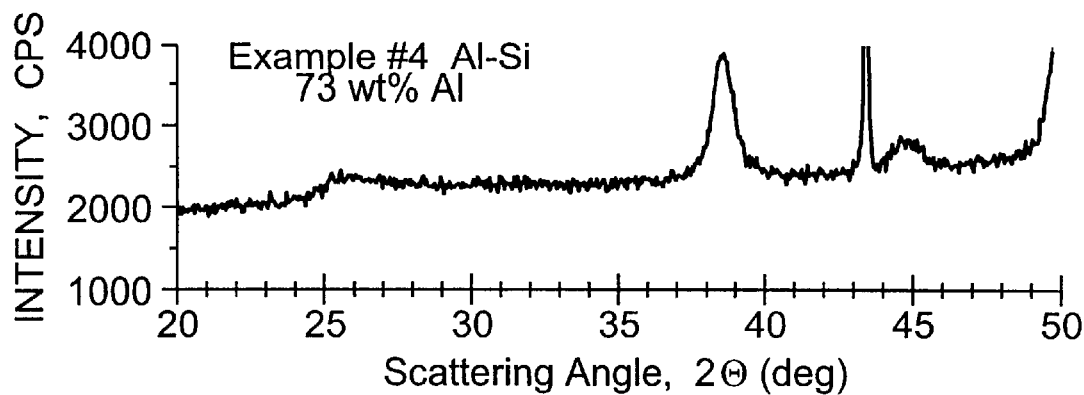

The x-ray diffraction pattern of the sputtered film prior to cycling is shown in FIG. 13(d). The pattern shows no signal for crystalline silicon and two broad signals for crystalline aluminum at 38.5 degrees (corresponding to Al(111)) and 44.7 degrees (corresponding to Al(200)). The average aluminum grain size is approximately 100 angstroms, calculated from the width of the peak at 38.5 degrees. There are no peaks corresponding to aluminum- and silicon-containing compounds.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/Cm$^2$. The initial discharge (lithiation) specific capacity was approximately 1950 mAh/g. For comparison purposes, the theoretical specific capacity of the cell, calculated based upon the wt. % of the film and the assumption that aluminum reacts with 1 Li/Al atom and silicon reacts with 4.4 Li/Si atom, is 1875 mAh/g.

Figure 6A:
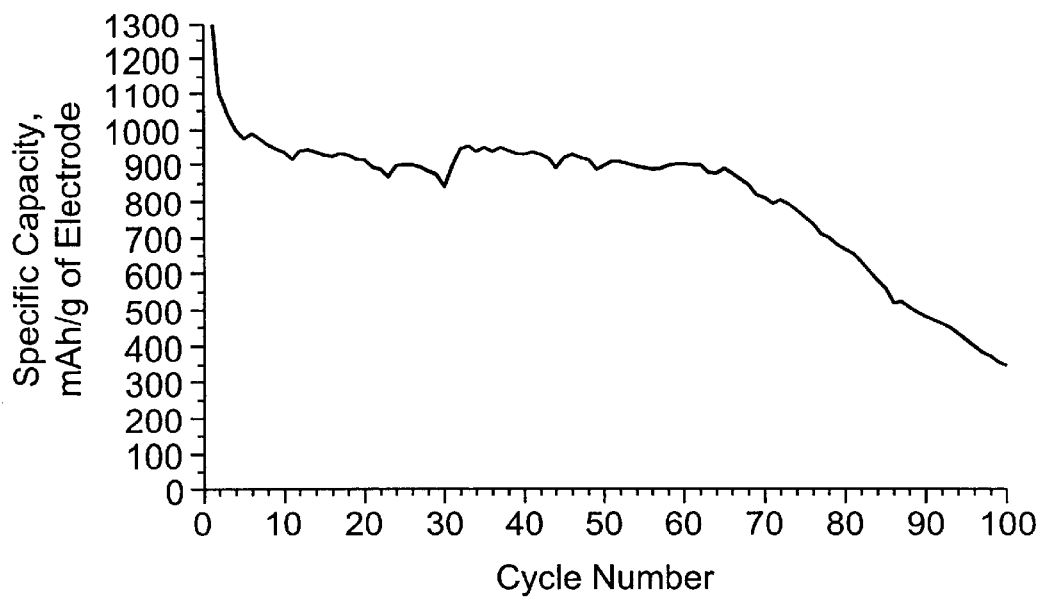
FIG. 6 illustrates the cycling performance, in terms of reversible specific capacity (top graph) and coulombic efficiency (bottom graph), of the sputter-deposited aluminum-silicon electrode described in Example 4.
Figure 6B:
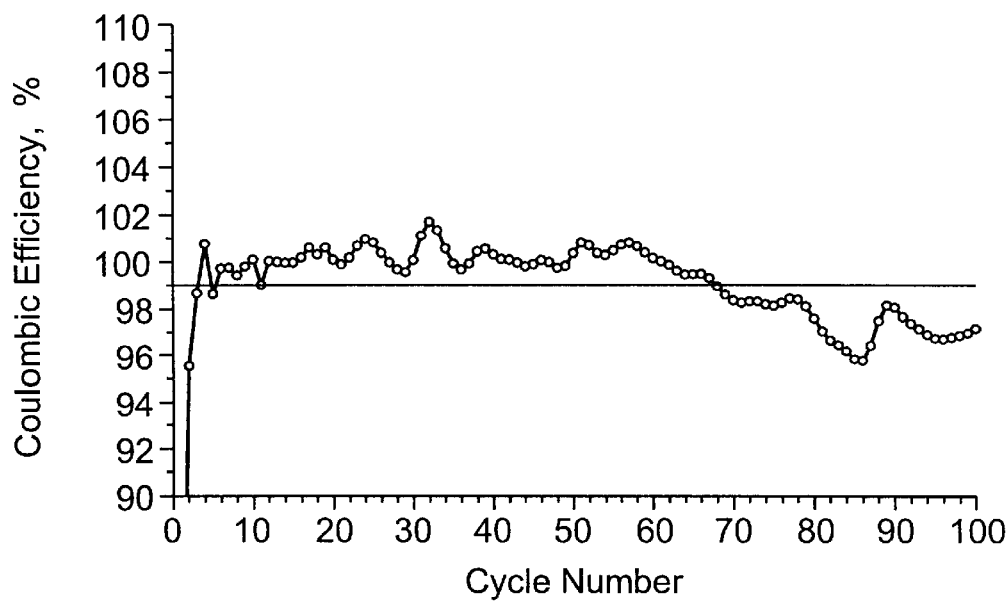

The cell was then placed under charge and discharge cycling conditions using a current of 0.5 mA/cm$^2$ and cutoff voltages of 5 mV and 0.9 V. The reversible specific capacity and coulombic efficiency of the cell are shown in FIG. 6. The results demonstrate that the films provided good capacity retention and coulombic efficiency up to 70 cycles, after which the capacity began to fade and the coulombic efficiency dropped below 99%.

Example 5

A film containing 78 wt. % aluminum and 22 wt. % silicon was prepared by sputter deposition under the conditions shown in Table I. The aluminum was sputter deposited at a rate of 640 angstroms/minute, while the silicon was sputter deposited at a rate of 210 angstroms/minute. The film contained 75 vol. % aluminum and 25 vol. % silicon, calculated based upon these sputter rates. The film thickness was 3.9 micrometers and the film density was approximately 2.6 g/cm$^3$. The film had a pre-layer of pure silicon measuring approximately 550 angstroms thick and a post-layer of pure aluminum measuring approximately 320 angstroms thick.

Figure 13E:
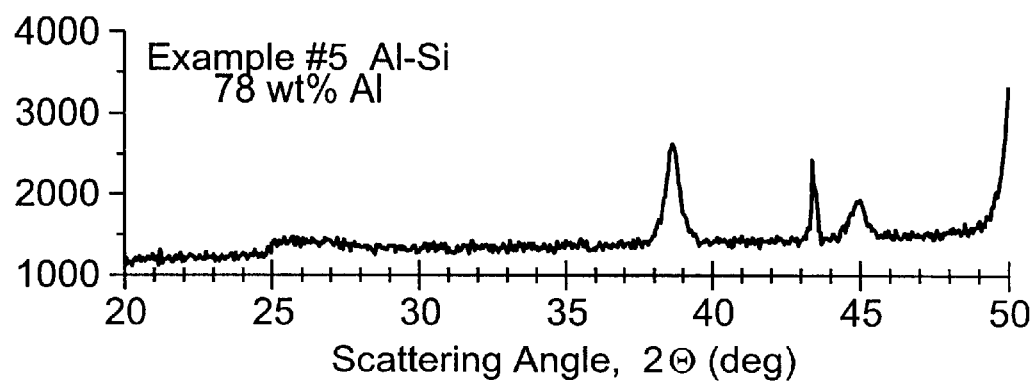

The x-ray diffraction pattern of the sputtered film prior to cycling is shown in FIG. 13(e). The pattern shows no signal for crystalline silicon and a sharp signal (relative to the signal for the film described in Example 1) for crystalline aluminum at 38.5 degrees (corresponding to Al(111)) and 44.7 degrees (corresponding to Al(200)). The average aluminum grain size is approximately 180 angstroms, calculated from the width of the peak at 38.5 degrees. There are no peaks corresponding to aluminum- and silicon-containing compounds.

TEM and electron diffraction analysis of the film prior to cycling revealed that the microstructure included 17.8% by volume of crystalline aluminum particles and 82.2% by volume of a mixture of aluminum and silicon atoms. The average size of the crystalline aluminum particles was 19.5 nm by 11.5 nm, with an average aspect ratio of 1.64. The crystalline aluminum particles were preferentially oriented with the long axis normal to the plane of the film.

Electron diffraction patterns indicated the presence of a two phase microstructure. One phase consisted of crystalline aluminum, as evidenced by sharp spots in a ring pattern which index to aluminum spacings of 2.34, 2.02, 1.43, and 1.22 angstroms, which, in turn, correspond, respectively, to the (111), (200), (220), and (311) lattice spacings of the face center cubic crystal structure for aluminum. The second phase was a mixture of very small aluminum and silicon domains characterized by a broad diffuse ring pattern, suggesting the absence of ordered crystalline material. The domain size was no greater than 20 angstroms. X-ray dispersive spectroscopy revealed inhomogeneity on a nanoscale level throughout the film.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/cm$^2$. The initial discharge (lithiation) specific capacity was approximately 1700 mAh/g. For comparison purposes, the theoretical specific capacity of the cell, calculated based upon the wt. % of the film and the assumption that aluminum reacts with 1 Li/Al atom and silicon reacts with 4.4 Li/Si atom, is 1650 mAh/g.

Figure 7A:
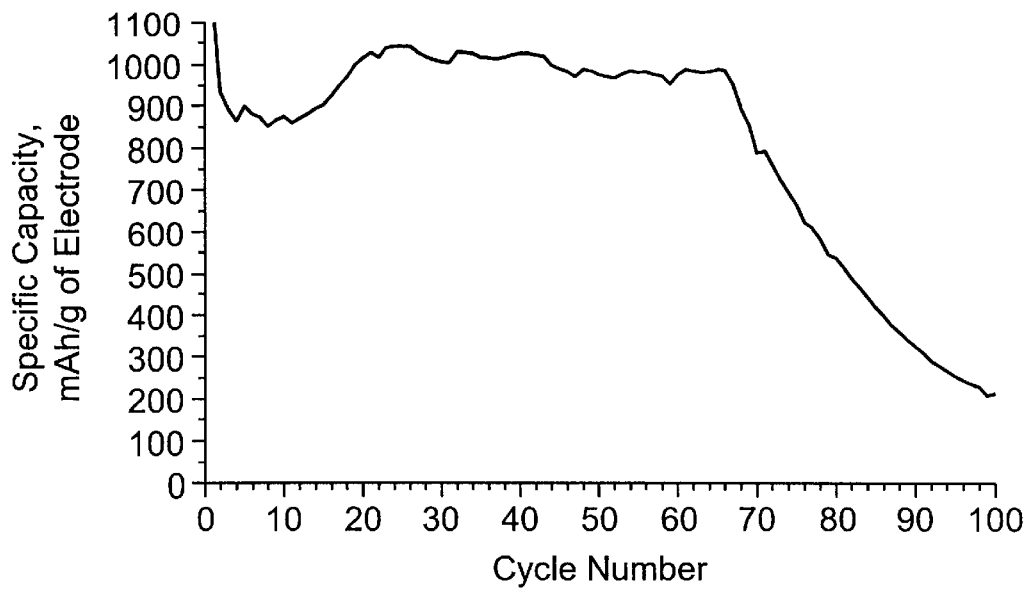
FIG. 7 illustrates the cycling performance, in terms of reversible specific capacity (top graph) and coulombic efficiency (bottom graph), of the sputter-deposited aluminum-silicon electrode described in Example 5.
Figure 7B:
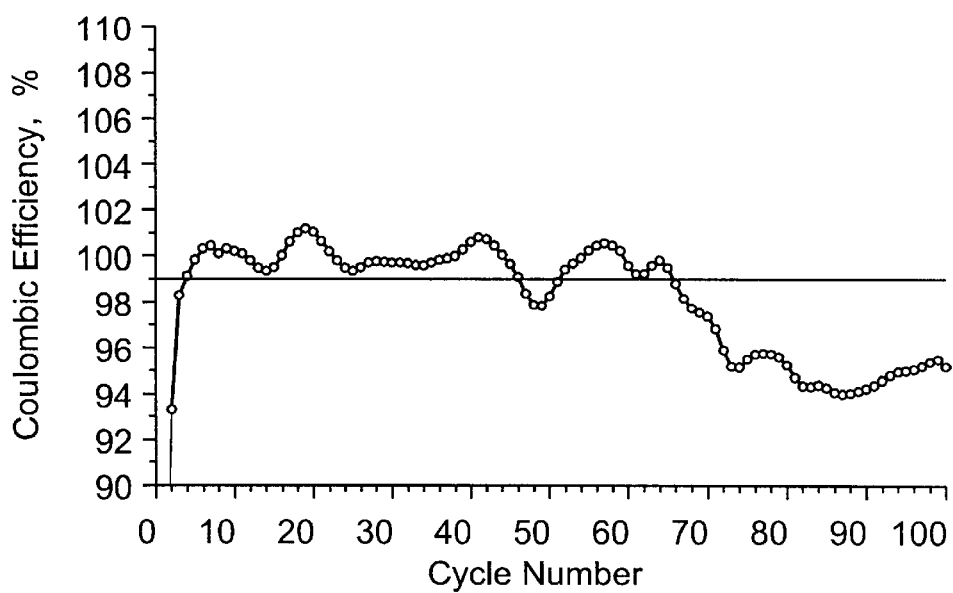

The cell was then placed under charge and discharge cycling conditions using a current of 0.5 mA/cm$^2$ and cutoff voltages of 5 mV and 1.0 V. The reversible specific capacity and coulombic efficiency of the cell are shown in FIG. 7. The results demonstrate that the films provided good capacity retention and coulombic efficiency up to 65 cycles, after which the capacity began to fade and the coulombic efficiency dropped below 99%.

Example 6

A film containing 72 wt. % tin and 28 wt. % silicon was prepared by sputter deposition under the conditions shown in Table I. The tin was sputter deposited at a rate of 140 angstroms/minute, while the silicon was sputter deposited at a rate of 110 angstroms/minute. The film contained 45 vol. % tin and 55 vol. % silicon, calculated based upon these sputter rates. The film thickness was 1.5 micrometers and the film density was approximately 4.5 g/cm$^3$. The film had a pre-layer of pure silicon measuring approximately 150 angstroms thick. There was no post-layer.

Figure 14A:
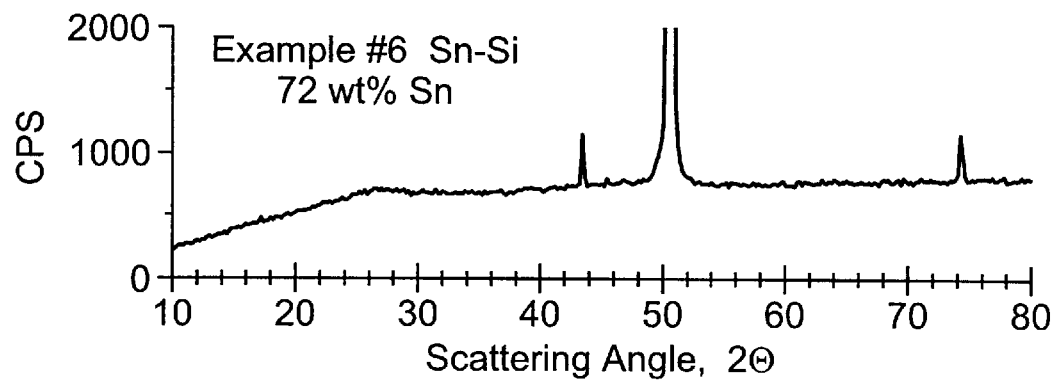
FIGS. 14(a), 14(b), 14(c), and 14(d) are x-ray diffraction profiles for the tin-silicon films described in Examples 6–9, respectively, obtained prior to cycling.

The x-ray diffraction pattern of the sputtered film prior to cycling is shown in FIG. 14(a). The pattern shows no signal for crystalline tin, crystalline silicon, or compounds containing these elements.

The cycling behavior of the electrode film was tested as described above using a 1225 coin cell featuring a lithium foil anode and the sputtered film as the cathode (half cell arrangement). The first discharge of the cell was a constant current discharge at 0.25 mA/cm$^2$ down to 5 mV, and then a constant voltage (5 mV) discharge until the current fell to 50 microamps/cm$^2$. The initial discharge (lithiation) specific capacity was approximately 1350 mAh/g. For comparison purposes, the theoretical specific capacity of the cell, calculated based upon the wt. % of the film and the assumption that tin reacts with 4.4 Li/Sn atom and silicon reacts with 4.4 Li/Si atom, is 1900 mAh/g.

Figure 8A:
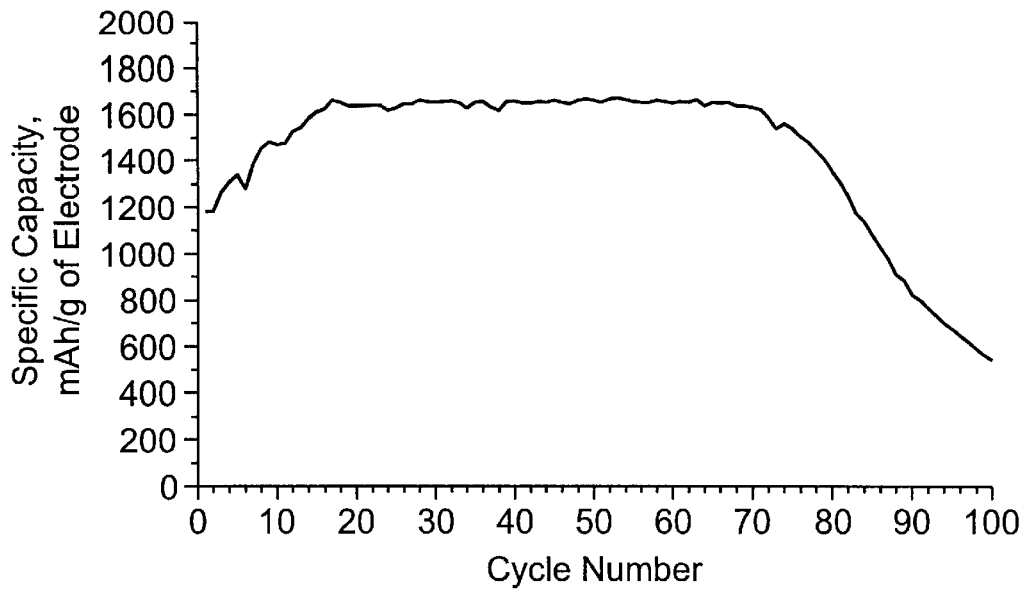
FIG. 8 illustrates the cycling performance, in terms of reversible specific capacity (top graph) and coulombic efficiency (bottom graph), of the sputter-deposited tin-silicon electrode described in Example 6.
Figure 8B:
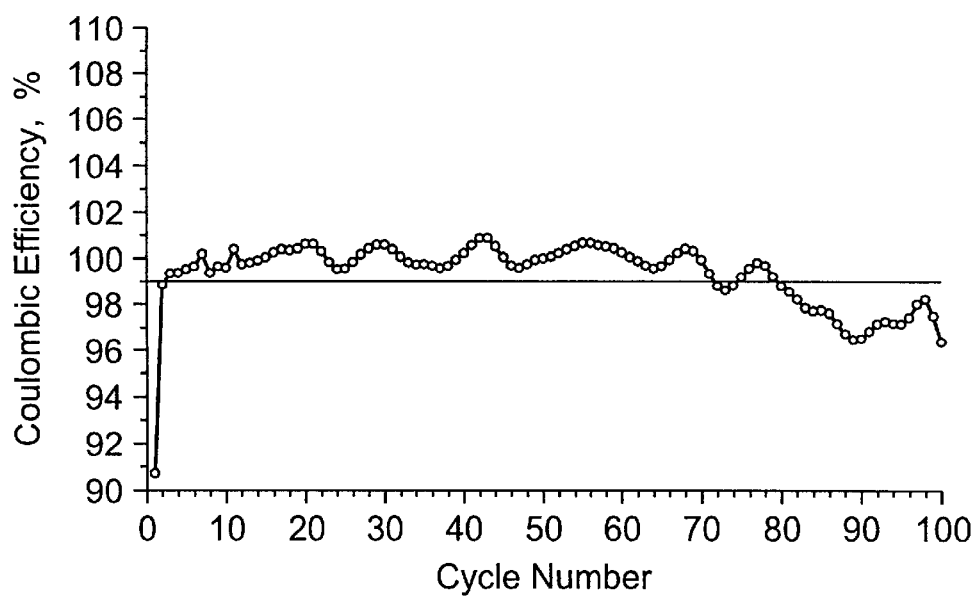

The cell was then placed under charge and discharge cycling conditions using a current of 0.25 mA/cm$^2$ and cutoff voltages of 5 mV and 1.4 V. The reversible specific capacity and coulombic efficiency of the cell are shown in FIG. 8. The results demonstrate that the film will cycle with high specific capacity and high coulombic efficiency for at least 70 cycles.

Example 7

A film containing 83 wt. % tin and 17 wt. % silicon was prepared by sputter deposition under the conditions shown in Table I. The tin was sputter deposited at a rate of 225 angstroms/minute, while the silicon was sputter deposited at a rate of 140 angstroms/minute. The film contained 62 vol. % tin and 38 vol. % silicon, calculated based upon these sputter rates. The film thickness was 1.9 micrometers and the film density was approximately 5.4 g/cm$^3$. The film had a pre-layer of pure silicon measuring approximately 150 angstroms thick. There was no post-layer.

Figure 14B:
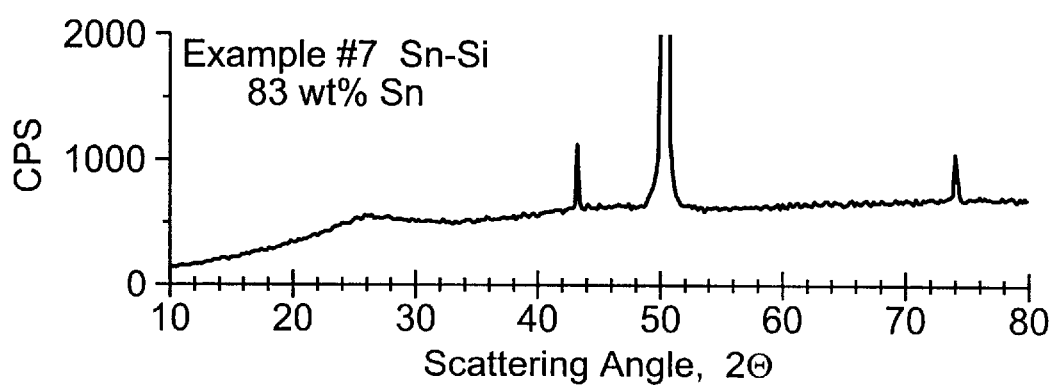

The x-ray diffraction pattern of the sputtered film prior to cycling is shown in FIG. 14(b). The pattern shows no signal for crystalline tin, crystalline silicon, or compounds containing these elements.

TEM and electron diffraction analysis of the film prior to cycling revealed that the microstructure included a mixture of very small tin and silicon domains. The microstructure was further characterized by the absence of ordered crystalline material on a scale of 10 angstroms or less. Z-contrast images showed variations in contrast indicative of a nanoscale compositional variation perpendicular to the film plane.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/cm$^2$. The initial discharge (lithiation) specific capacity was approximately 1250 mAh/g. For comparison purposes, the theoretical specific capacity of the cell, calculated based upon the wt. % of the film and the assumption that tin reacts with 4.4 Li/Sn atom and silicon reacts with 4.4 Li/Si atom, is 1525 mAh/g.

Figure 9A:
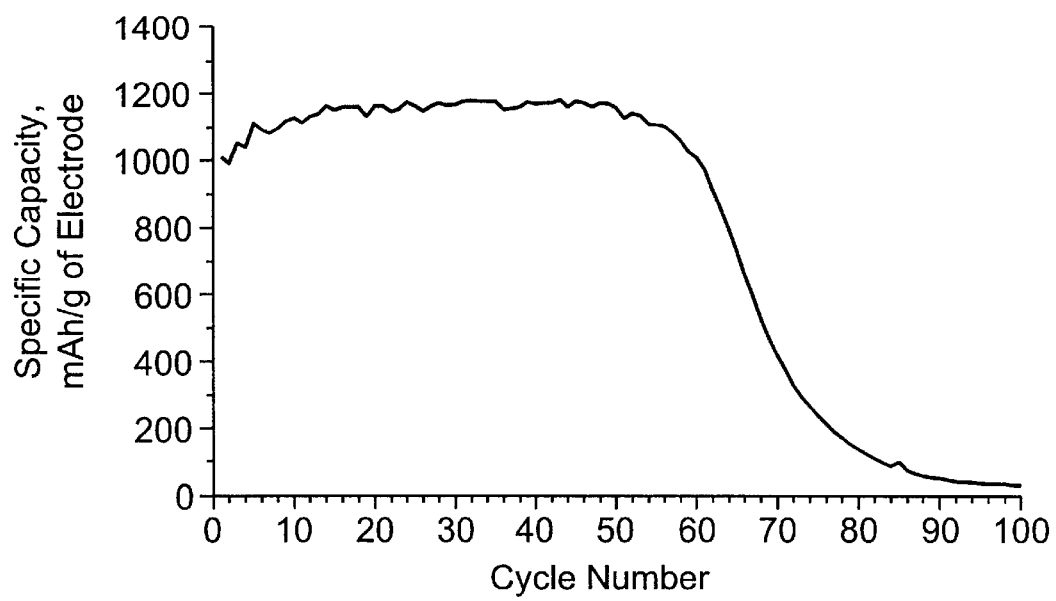
FIG. 9 illustrates the cycling performance, in terms of reversible specific capacity (top graph) and coulombic efficiency (bottom graph), of the sputter-deposited tin-silicon electrode described in Example 7.
Figure 9B:
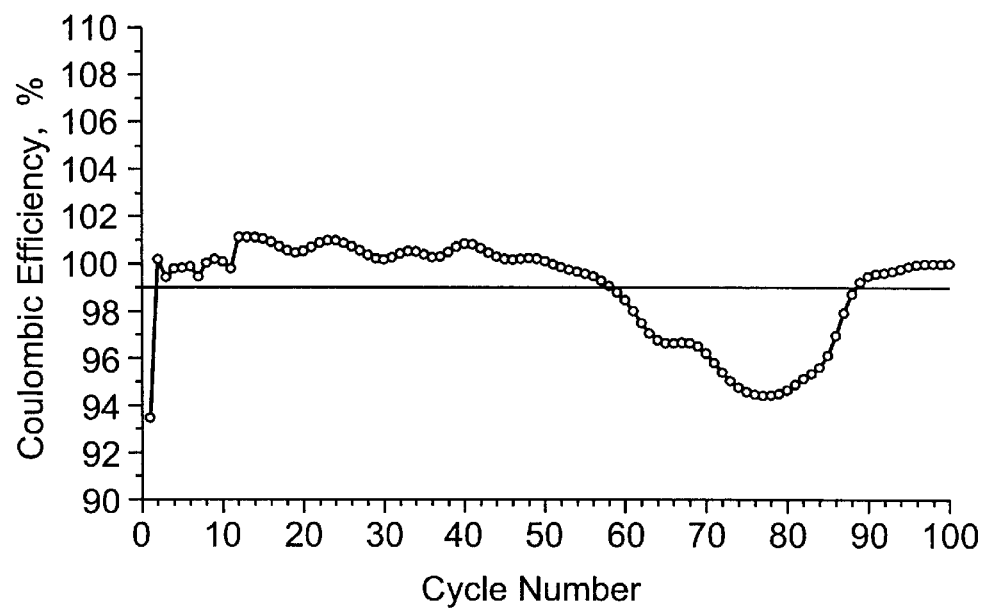

The cell was then placed under charge and discharge cycling conditions using a current of 0.5 mA/cm$^2$ and cutoff voltages of 5 mV and 1.4 V. The reversible specific capacity and coulombic efficiency of the cell are shown in FIG. 9. The results demonstrate that the film will cycle with high specific capacity and high coulombic efficiency for at least 60 cycles.

Figure 16A:
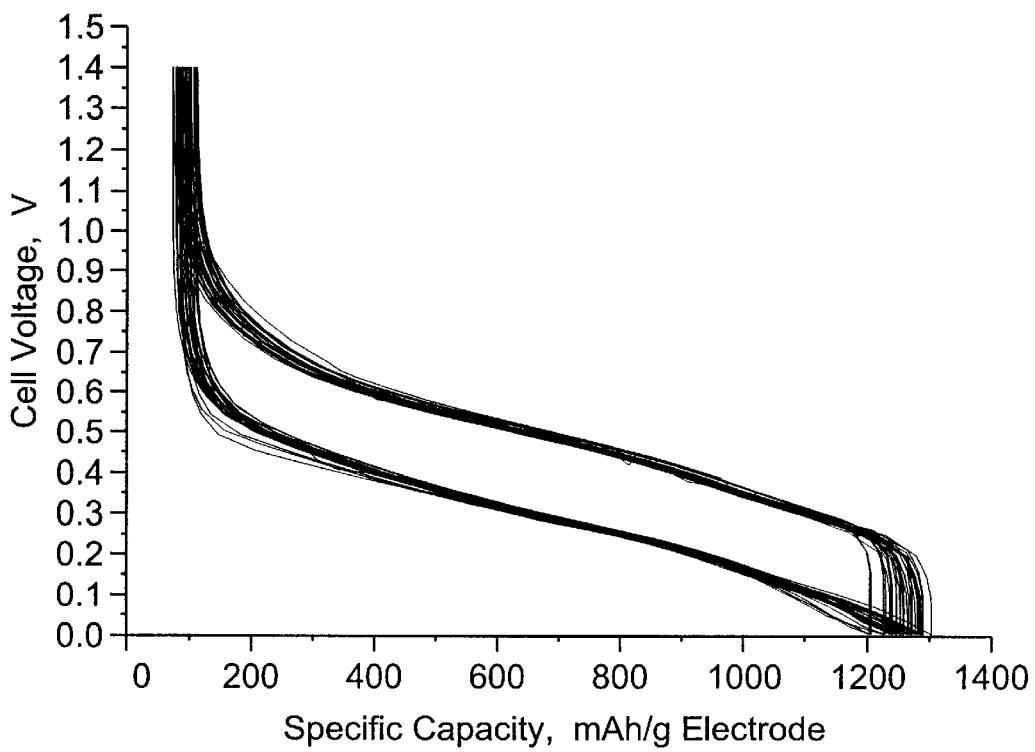
FIG. 16 is a charge/voltage curve and differential voltage curve for the sputter-deposited tin-silicon electrode described in Example 7.
Figure 16B:
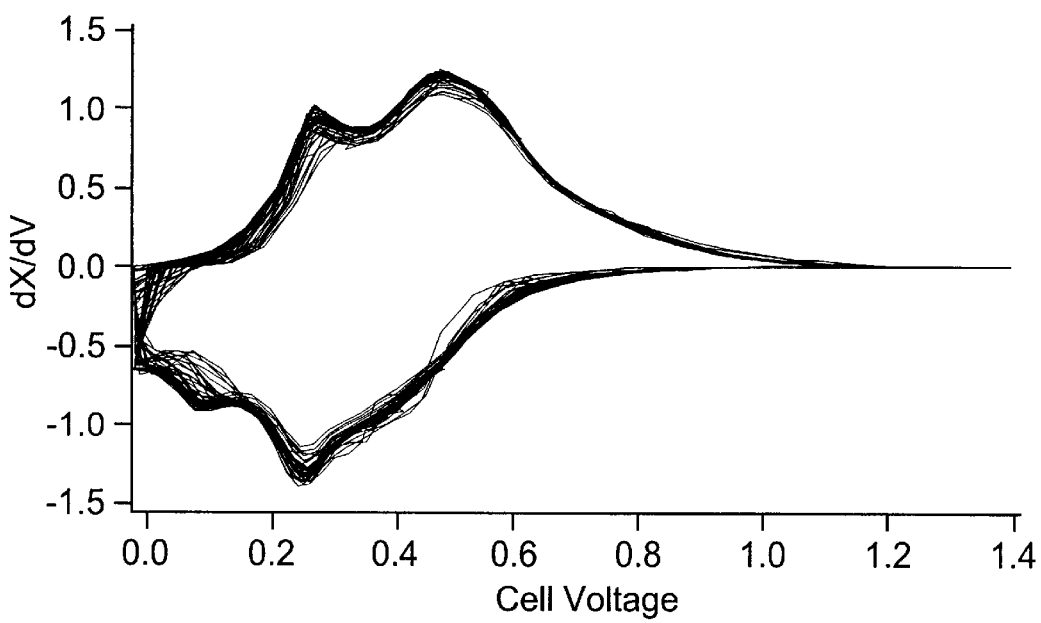

The charge/discharge voltage curve and the differential voltage curve from cycle 5 to cycle 75 are shown in FIG. 16. The data show that there are no significant changes in the electrochemical behavior during cycling, and that the capacity is realized over a broad voltage range.

Example 8

A film containing 87 wt. % tin and 13 wt. % silicon was prepared by sputter deposition under the conditions shown in Table I. The tin was sputter deposited at a rate of 310 angstroms/minute, while the silicon was sputter deposited at a rate of 140 angstroms/minute. The film contained 69 vol. % tin and 31 vol. % silicon, calculated based upon these sputter rates. The film thickness was 2.3 micrometers and the film density was approximately 5.8 g/cm$^3$. The film had a pre-layer of pure silicon measuring approximately 150 angstroms thick. There was no post-layer.

Figure 14C:
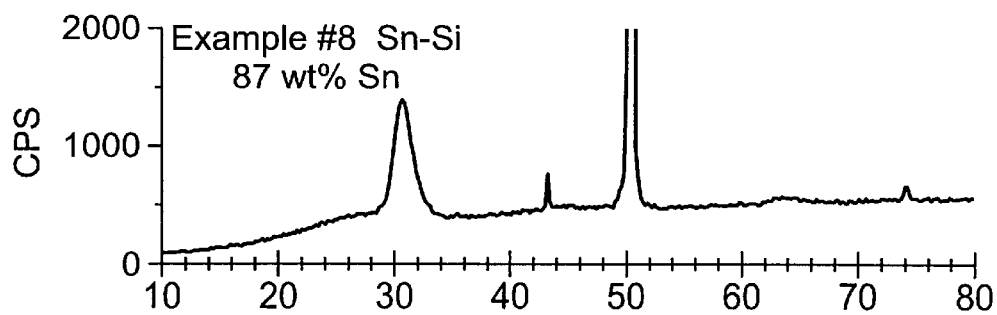

The x-ray diffraction pattern of the sputtered film prior to cycling is shown in FIG. 14(c). The pattern shows no signal for crystalline silicon and a broad signal for crystalline tin at 31 degrees. There are no peaks corresponding to tin- and silicon-containing compounds.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/cm$^2$. The initial discharge (lithiation) specific capacity was approximately 1200 mAh/g. For comparison purposes, the theoretical specific capacity of the cell, calculated based upon the wt. % of the film and the assumption that tin reacts with 4.4 Li/Sn atom and silicon reacts with 4.4 Li/Si atom, is 1400 mAh/g.

Figure 10A:
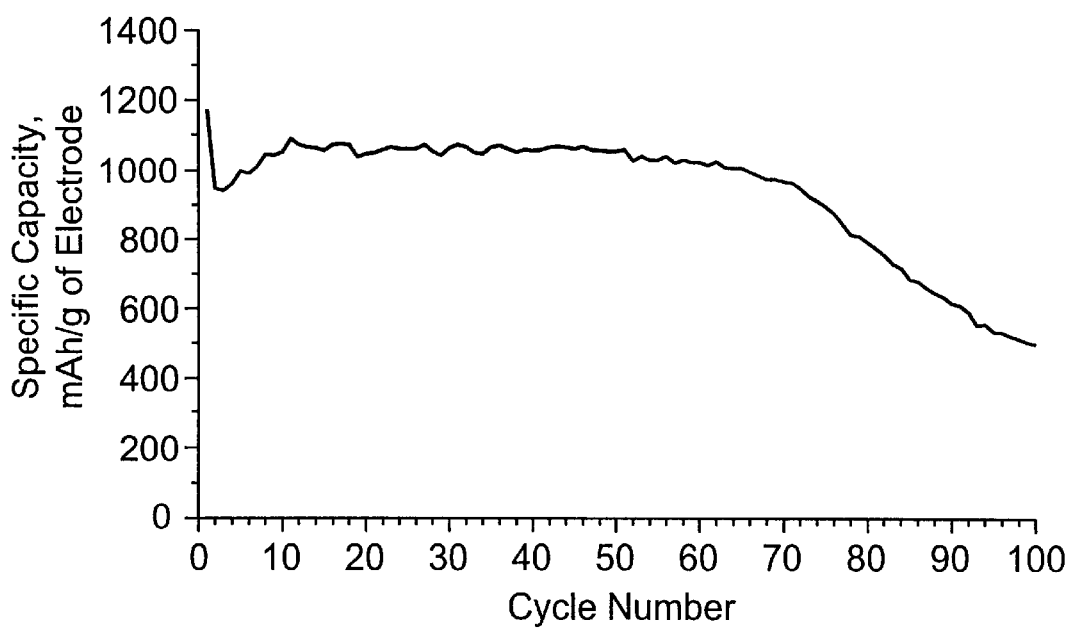
FIG. 10 illustrates the cycling performance, in terms of reversible specific capacity (top graph) and coulombic efficiency (bottom graph), of the sputter-deposited tin-silicon electrode described in Example 8.
Figure 10B:
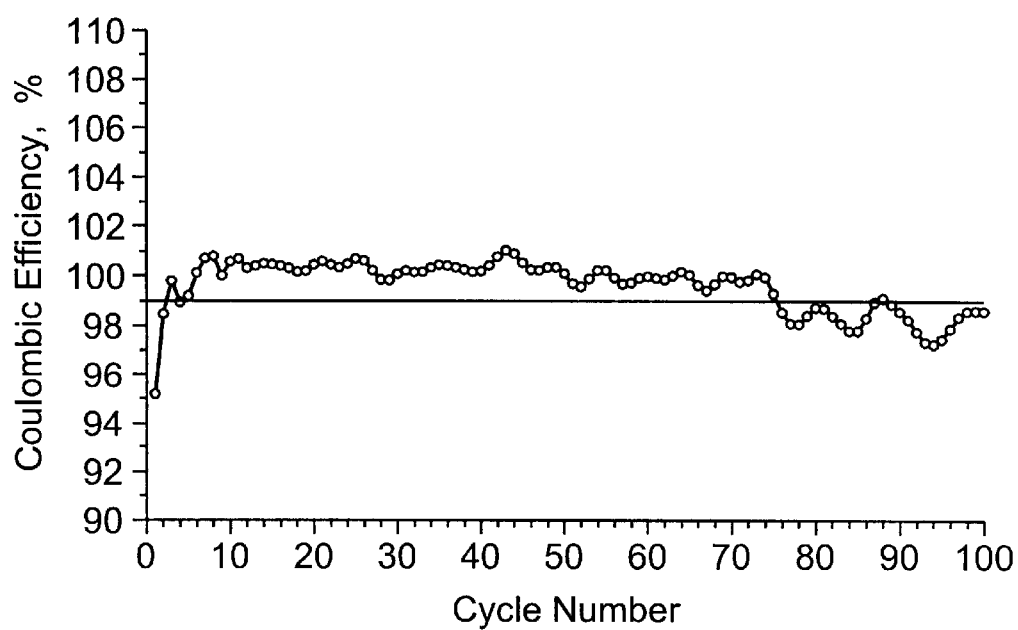

The cell was then placed under charge and discharge cycling conditions using a current of 0.5 mA/cm$^2$ and cutoff voltages of 5 mV and 1.4 V. The reversible specific capacity and coulombic efficiency of the cell are shown in FIG. 10. The results demonstrate that the film will cycle with high specific capacity and high coulombic efficiency for at least 70 cycles.

Full cells were constructed as described above using a sputtered film as an anode and a LiCoO$_2$-containing composition as the cathode. The sputtered film was identical to the sputtered film described above except that sputtering was conducted for a total of 110 minutes to yield a 5.3 micrometer thick film. The mass balance of the full cell, calculated based upon the weight of the LiCoO$_2$ portion of the cathode and the weight of the sputtered film, was 6.5:1. The cell was then cycled with a constant charge and discharge current of 0.5 mA/cm$^2$ between 1.8 and 4.2 V.

Figure 11A:
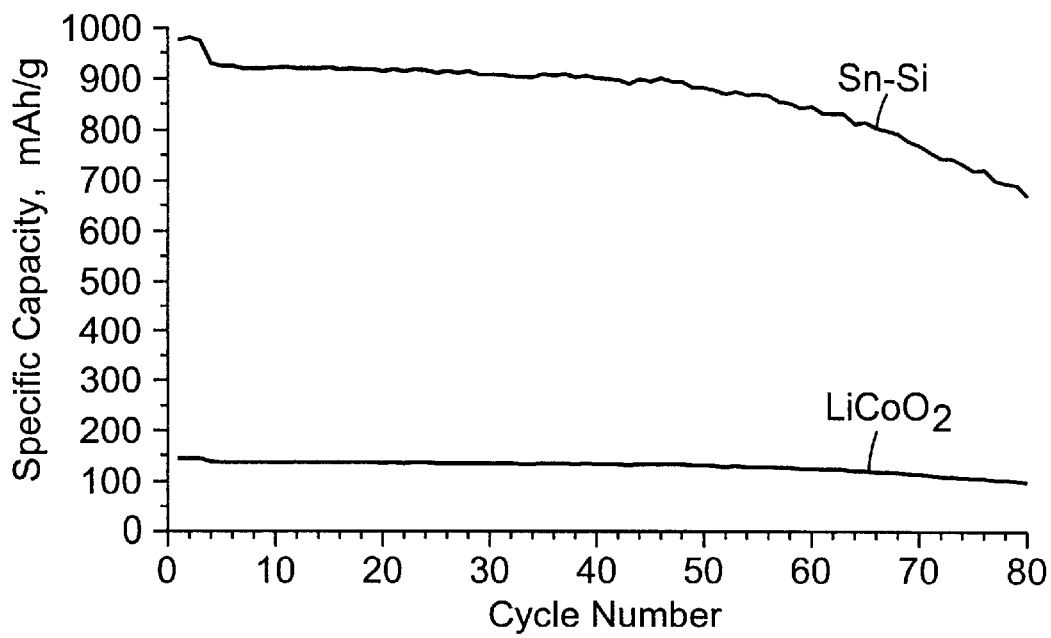
FIG. 11 illustrates the cycling performance, in terms of reversible specific capacity (top graph) and coulombic efficiency (bottom graph), of a full cell featuring the sputter-deposited tin-silicon electrode described in Example 8, and a $LiCoO_2$-containing cathode.
Figure 11B:
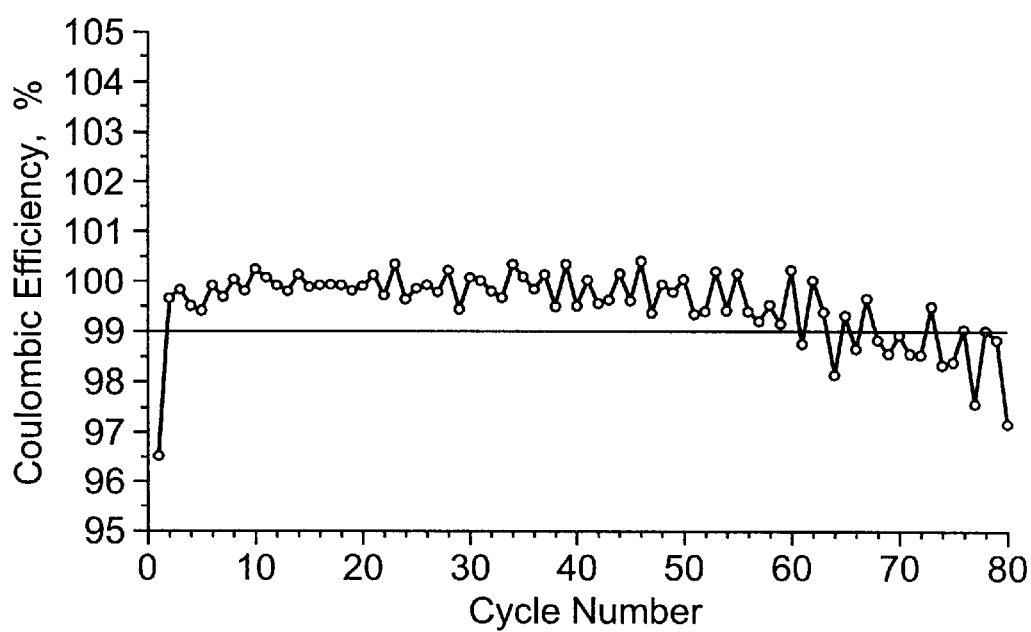

The specific capacity and coulombic efficiency of the cell is shown in FIG. 11. The first charge capacity was 150 mAh/g for LiCoO$_2$ and 1000 mAh/g for the tin-silicon material in the anode. The irreversible capacity in the first cycle was 4%. The specific capacity of the tin-silicon anode is similar to what was obtained in the coin cells described above using lithium foil as the anode. The specific capacity of the LiCoO$_2$ was maintained at 130 mAh/g, which is a reasonable capacity for this material.

The results demonstrate that the tin-silicon composition can be used in an electrochemical cell as an anode in combination with a cathode material (LiCoO$_2$) typically used in lithium-ion batteries. The coulombic efficiency of the cell remained about 99.0% for at least 60 cycles with very small capacity fade (about 0.1%/cycle).

Example 9

A film containing 90 wt. % tin and 10 wt. % silicon was prepared by sputter deposition under the conditions shown in Table I. The tin was sputter deposited at a rate of 420 angstroms/minute, while the silicon was sputter deposited at a rate of 140 angstroms/minute. The film contained 75 vol. % tin and 25 vol. % silicon, calculated based upon these sputter rates. The film thickness was 2.1 micrometers and the film density was approximately 6.0 g/cm$^3$. The film had a pre-layer of pure silicon measuring approximately 150 angstroms thick. There was no post-layer.

Figure 14D:
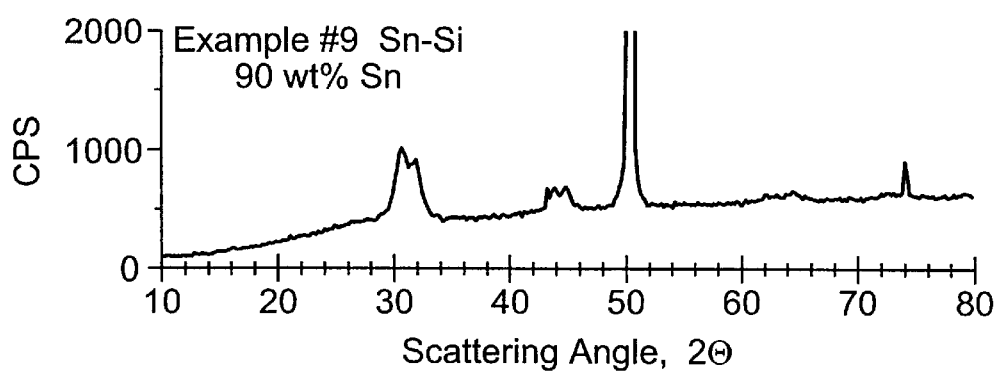

The x-ray diffraction pattern of the sputtered film prior to cycling is shown in FIG. 14(d). The pattern shows no signal for crystalline silicon and signals for crystalline tin at 30.6 degrees (corresponding to Sn(200)), 32.0 degrees (corresponding to Sn(101), 43.9 degrees (corresponding to Sn(220), and 44.9 degrees (corresponding to Sn(211)). There are no peaks corresponding to tin- and silicon-containing compounds.

The cycling behavior of the electrode film was tested as described above using a 1225 coin cell featuring a lithium foil anode and the sputtered film as the cathode (half cell arrangement). The first discharge of the cell was a constant current discharge at 0.5 mA/cm$^2$ down to 5 mV, and then a constant voltage (5 mV) discharge until the current fell to 50 microamps/cm$^2$. The initial discharge (lithiation) specific capacity was approximately 1150 mAh/g. For comparison purposes, the theoretical specific capacity of the cell, calculated based upon the wt. % of the film and the assumption that tin reacts with 4.4 Li/Sn atom and silicon reacts with 4.4 Li/Si atom, is 1300 mAh/g.

Figure 12A:
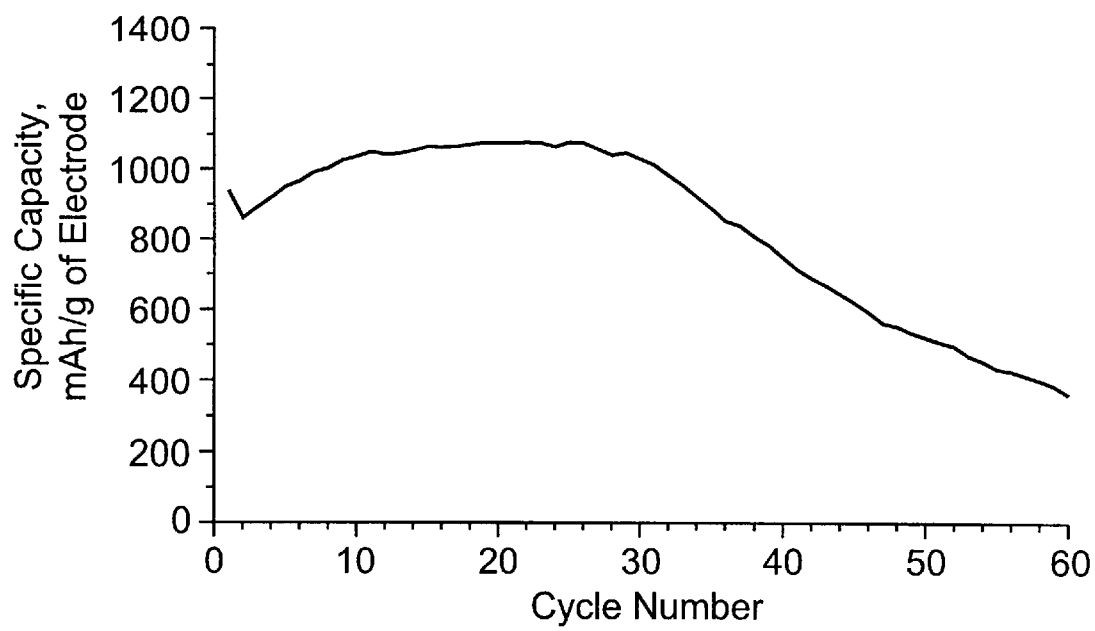
FIG. 12 illustrates the cycling performance, in terms of reversible specific capacity (top graph) and coulombic efficiency (bottom graph), of the sputter-deposited tin-silicon electrode described in Example 9.
Figure 12B:
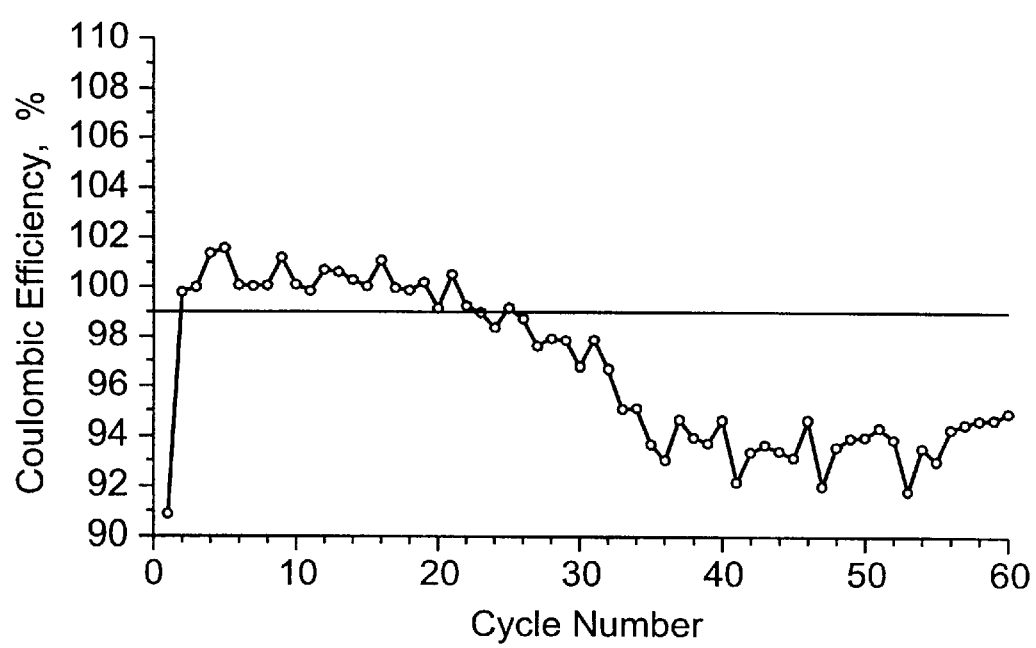

The cell was then placed under charge and discharge cycling conditions using a current of 0.5 mA/cm$^2$ and cutoff voltages of 5 mV and 1.4 V. The reversible specific capacity and coulombic efficiency of the cell are shown in FIG. 12. The results demonstrate that the film will cycle with high specific capacity and high coulombic efficiency for at least 30 cycles.

Other embodiments are within the following claims.

What is claimed is:

1. An electrode composition comprising: an electrode material consisting essentially of a plurality of electrochemically active metal elements, said electrode material having a microstructure comprising said elements in the form of a mixture that is essentially free of domains measuring greater than about 1000 angstroms wherein the mixture does not exhibit a discernible electron diffraction or x-ray diffraction pattern characteristic of a crystalline material.

2. An electrode composition according to claim 1 wherein at least about 50% by volume of said electrode material is in the form of said mixture.

3. An electrode composition according to claim 1 wherein at least about 80% by volume of said electrode material is in the form of said mixture.

4. An electrode composition according to claim 1 wherein said mixture is essentially free of domains measuring greater than about 500 angstroms.

5. An electrode composition according to claim 1 wherein said mixture is essentially free of domains measuring greater than about 100 angstroms.

6. An electrode composition according to claim 1 wherein said mixture is essentially free of domains measuring greater than about 20 angstroms.

7. An electrode composition according to claim 1 wherein said composition, when incorporated in a lithium battery, exhibits (i) a specific capacity of at least about 100 mAh/g for 30 full charge-discharge cycles and (ii) a coulombic efficiency of at least 99% for 30 full charge-discharge cycles when cycled to realize about 100 mAh/g of said composition.

8. An electrode composition according to claim 7 wherein said coulombic efficiency is at least 99.5%.

9. An electrode composition according to claim 7 wherein said coulombic efficiency is at least 99.9%.

10. An electrode composition according to claim 1 wherein said composition, when incorporated in a lithium battery, exhibits (i) a specific capacity of at least about 100 mAh/g for 500 full charge-discharge cycles and (ii) a coulombic efficiency of at least 99% for 500 full charge-discharge cycles when cycled to realize about 100 mAh/g of said composition.

11. An electrode composition according to claim 10 wherein said coulombic efficiency is at least 99.5%.

12. An electrode composition according to claim 10 wherein said coulombic efficiency is at least 99.9%.

13. An electrode composition according to claim 1 wherein said composition, when incorporated in a lithium battery, exhibits (i) a specific capacity of at least about 100 mAh/g for 1000 full charge-discharge cycles and (ii) a coulombic efficiency of at least 99% for 1000 full charge-discharge cycles when cycled to realize about 100 mAh/g of said composition.

14. An electrode composition according to claim 13 wherein said coulombic efficiency is at least 99.5%.

15. An electrode composition according to claim 13 wherein said coulombic efficiency is at least 99.9%.

16. An electrode composition according to claim 1 wherein said composition, when incorporated in a lithium battery, exhibits (i) a specific capacity of at least about 500 mAh/g for 30 full charge-discharge cycles and (ii) a coulombic efficiency of at least 99% for 30 full charge-discharge cycles when cycled to realize about 500 mAh/g of said composition.

17. An electrode composition according to claim 16 wherein said coulombic efficiency is at least 99.5%.

18. An electrode composition according to claim 16 wherein said coulombic efficiency is at least 99.9%.

19. An electrode composition according to claim 1 wherein said composition, when incorporated in a lithium battery, exhibits (i) a specific capacity of at least about 500 mAh/g for 200 full charge-discharge cycles and (ii) a coulombic efficiency of at least 99% for 200 full charge-discharge cycles when cycled to realize about 500 mAh/g of said composition.

20. An electrode composition according to claim 19 wherein said coulombic efficiency is at least 99.5%.

21. An electrode composition according to claim 19 wherein said coulombic efficiency is at least 99.9%.

22. An electrode composition according to claim 1 wherein said composition, when incorporated in a lithium battery, exhibits (i) a specific capacity of at least about 500 mAh/g for 500 full charge-discharge cycles and (ii) a coulombic efficiency of at least 99% for 500 full charge-discharge cycles when cycled to realize about 500 mAh/g of said composition.

23. An electrode composition according to claim 22 wherein said coulombic efficiency is at least 99.5%.

24. An electrode composition according to claim 22 wherein said coulombic efficiency is at least 99.9%.

25. An electrode composition according to claim 1 wherein said composition, when incorporated in a lithium battery, exhibits (i) a specific capacity of at least about 1000 mAh/g for 30 full charge-discharge cycles and (ii) a coulombic efficiency of at least 99% for 30 full charge-discharge cycles when cycled to realize about 1000 mAh/g of said composition.

26. An electrode composition according to claim 25 wherein said coulombic efficiency is at least 99.5%.

27. An electrode composition according to claim 25 wherein said coulombic efficiency is at least 99.9%.

28. An electrode composition according to claim 1 wherein said composition, when incorporated in a lithium battery, exhibits (i) a specific capacity of at least about 1000 mAh/g for 100 full charge-discharge cycles and (ii) a coulombic efficiency of at least 99% for 100 full charge-discharge cycles when cycled to realize about 1000 mAh/g of said composition.

29. An electrode composition according to claim 28 wherein said coulombic efficiency is at least 99.5%.

30. An electrode composition according to claim 28 wherein said coulombic efficiency is at least 99.9%.

31. An electrode composition according to claim 1 wherein said composition, when incorporated in a lithium battery, exhibits (i) a specific capacity of at least about 1000 mAh/g for 300 full charge-discharge cycles and (ii) a coulombic efficiency of at least 99% for 300 full charge-discharge cycles when cycled to realize about 1000 mAh/g of said composition.

32. An electrode composition according to claim 31 wherein said coulombic efficiency is at least 99.5%.

33. An electrode composition according to claim 31 wherein said coulombic efficiency is at least 99.9%.

34. An electrode composition according to claim 1 wherein said electrochemically active metal elements are selected from the group consisting of aluminum, silicon, tin, antimony, lead, germanium, magnesium, zinc, cadmium, bismuth, and indium.

35. An electrode composition according to claim 1 wherein one of said electrochemically active metal elements is aluminum and another of said electrochemically active metal elements is silicon.

36. An electrode composition according to claim 1 wherein one of said electrochemically active metal elements is silicon and another of said electrochemically active metal element is tin.

37. An electrode composition according to claim 1 wherein said composition is in the form of a thin film.

38. An electrode composition according to claim 1 wherein said composition is in the form of a powder.

39. An electrode material consisting essentially of a plurality of electrochemically active metal elements, said electrode material having a microstructure comprising said elements in the form of a mixture that is essentially free of domains measuring greater than about 1000 angstroms wherein the mixture does not exhibit a discernible electron diffraction or x-ray diffraction pattern characteristic of a crystalline material.

40. A lithium battery comprising:
   a) a first electrode comprising an electrode material consisting essentially of a plurality of electrochemically active metal elements, said electrode material having a microstructure comprising said elements in the form of a mixture that is essentially free of domains measuring greater than about 1000 angstroms wherein the mixture does not exhibit a discernible electron diffraction or x-ray diffraction pattern characteristic of a crystalline material;
   b) a counterelectrode; and
   c) an electrolyte separating said electrode and said counterelectrode.

* * * * *